US012681277B2

(12) United States Patent
Tung et al.

(10) Patent No.: US 12,681,277 B2
(45) Date of Patent: Jul. 14, 2026

(54) IMAGING LENS ASSEMBLY MODULE, CAMERA MODULE AND ELECTRONIC DEVICE

(71) Applicant: LARGAN PRECISION CO., LTD., Taichung City (TW)

(72) Inventors: Wei-Che Tung, Taichung City (TW); Lin-An Chang, Taichung City (TW); Wen-Yu Tsai, Taichung City (TW); Chien-Pang Chang, Taichung City (TW); Kuo-Chiang Chu, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 280 days.

(21) Appl. No.: 18/636,473

(22) Filed: Apr. 16, 2024

(65) Prior Publication Data

US 2024/0353656 A1 Oct. 24, 2024

Related U.S. Application Data

(60) Provisional application No. 63/496,708, filed on Apr. 18, 2023.

(30) Foreign Application Priority Data

Feb. 23, 2024 (TW) ................................ 113106689

(51) Int. Cl.
*G02B 17/00* (2006.01)
*G02B 7/18* (2021.01)
(Continued)

(52) U.S. Cl.
CPC ....... *G02B 13/0065* (2013.01); *G02B 7/1805* (2013.01); *G03B 17/17* (2013.01); *G03B 30/00* (2021.01); *G02B 27/0018* (2013.01)

(58) Field of Classification Search
CPC .............. G02B 7/1805; G02B 13/0065; G02B 27/0018; G03B 17/17; G03B 30/00
(Continued)

(56) References Cited

U.S. PATENT DOCUMENTS

| | | | |
|---|---|---|---|
| 10,082,649 | B2 | 9/2018 | Park |
| 11,442,257 | B2 | 9/2022 | Lin |

(Continued)

FOREIGN PATENT DOCUMENTS

| | | | |
|---|---|---|---|
| CN | 112882137 | A | 6/2021 |
| CN | 214409431 | U | 10/2021 |

(Continued)

*Primary Examiner* — Mahidere S Sahle
(74) *Attorney, Agent, or Firm* — McClure, Qualey & Rodack, LLP

(57) ABSTRACT

An imaging lens assembly module includes an imaging lens assembly, a light path folding element and a plastic assembling element. The imaging lens assembly includes an optical lens element. The light path folding element has a light incident surface, a light exiting surface and an optical reflecting surface. The plastic assembling element includes an assembling surface, a first surface and a second surface. The assembling surface is physically contacted with the light path folding element. Both the first surface and the second surface are disposed towards the light path folding element, and the second surface and the first surface are disposed adjacent to each other. The second surface and the optical reflecting surface are correspondingly disposed. The second surface includes a protruding structure array, and the protruding structure array includes at least seven protruding structures arranged at equal intervals.

22 Claims, 27 Drawing Sheets

(51) Int. Cl.

| | |
|---|---|
| ***G02B 13/00*** | (2006.01) |
| ***G03B 17/17*** | (2021.01) |
| ***G03B 30/00*** | (2021.01) |
| *G02B 27/00* | (2006.01) |

(58) Field of Classification Search
USPC .................................. 359/726–736, 831–837
See application file for complete search history.

(56) References Cited

U.S. PATENT DOCUMENTS

| | | | |
|---|---|---|---|
| 11,852,848 | B2 | 12/2023 | Tsai et al. |
| 11,867,887 | B2 | 1/2024 | Liao et al. |
| 2021/0080706 | A1 | 3/2021 | Lin |
| 2022/0091373 | A1 | 3/2022 | Saiga |
| 2022/0163706 | A1 | 5/2022 | Feldman |
| 2022/0373775 | A1 | 11/2022 | Lin |
| 2023/0224562 | A1 | 7/2023 | Chang et al. |
| 2023/0324656 | A1 | 10/2023 | Tsai et al. |

FOREIGN PATENT DOCUMENTS

| | | | |
|---|---|---|---|
| CN | 217404597 | U | 9/2022 |
| CN | 217406638 | U | 9/2022 |
| CN | 115314623 | A | 11/2022 |

630

10

30

IMAGING LENS ASSEMBLY MODULE, CAMERA MODULE AND ELECTRONIC DEVICE

RELATED APPLICATIONS

This application claims priority to U.S. Provisional Application Ser. No. 63/496,708, filed Apr. 18, 2023, and Taiwan Application Serial Number 113106689, filed Feb. 23, 2024, which are herein incorporated by reference.

BACKGROUND

Technical Field

The present disclosure relates to an imaging lens assembly module and a camera module. More particularly, the present disclosure relates to an imaging lens assembly module and a camera module applicable to portable electronic devices.

Description of Related Art

In recent years, portable electronic devices have developed rapidly. For example, intelligent electronic devices and tablets have been filled in the lives of modern people, and imaging lens assembly modules mounted on portable electronic devices have also prospered. However, as the technology advances, the quality requirements of imaging lens assembly module are becoming higher and higher. Therefore, developing an imaging lens assembly module that can enhance the imaging quality has become a crucial and urgent issue in the related industries.

SUMMARY

According to one aspect of the present disclosure, an imaging lens assembly module includes an imaging lens assembly, a light path folding element and a plastic assembling element. The imaging lens assembly includes at least one optical lens element. The light path folding element is disposed on an image side of the at least one optical lens element, wherein the light path folding element has a light incident surface, a light exiting surface and at least one optical reflecting surface. The plastic assembling element includes an assembling surface, a first surface and a second surface. The assembling surface is for assembling the plastic assembling element to the light path folding element, wherein the assembling surface is physically contacted with the light path folding element. The first surface is disposed towards the light path folding element. The second surface is disposed towards the light path folding element, wherein the second surface and the first surface are disposed adjacent to each other. The second surface of the plastic assembling element and the at least one optical reflecting surface of the light path folding element are correspondingly disposed. The second surface includes a protruding structure array, and the protruding structure array includes at least seven protruding structures arranged at equal intervals.

According to one aspect of the present disclosure, a camera module includes the imaging lens assembly module according to the aforementioned aspect and an image sensor disposed on an image surface of the imaging lens assembly module.

According to one aspect of the present disclosure, an electronic device includes the camera module according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
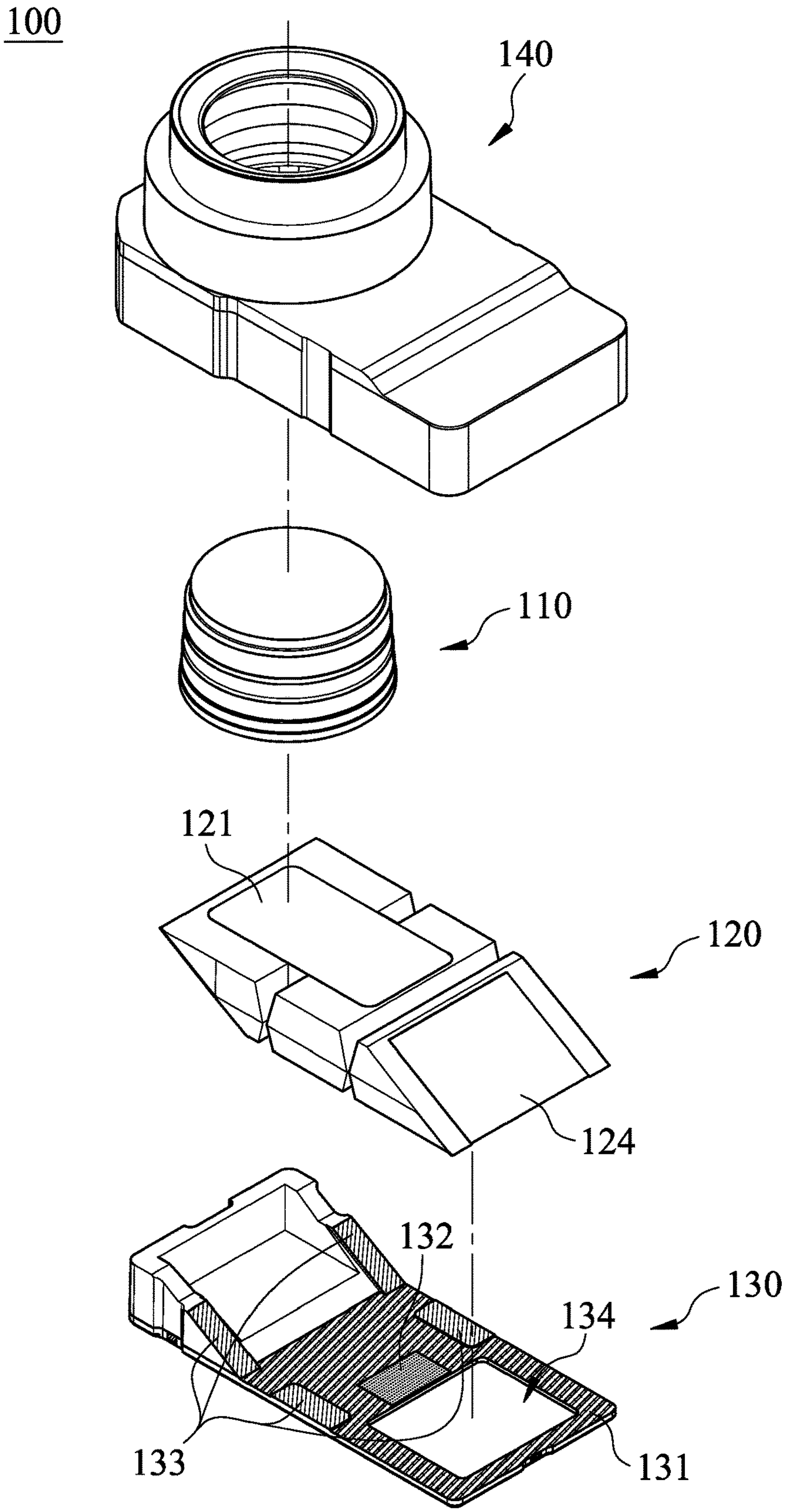
FIG. 1A is an exploded view of an imaging lens assembly module according to the 1st example of the present disclosure.

The present disclosure provides an imaging lens assembly module including an imaging lens assembly, a light path folding element and a plastic assembling element. The imaging lens assembly includes at least one optical lens element. The light path folding element is disposed on an image side of the optical lens element, wherein the light path folding element has a light incident surface, a light exiting surface and at least one optical reflecting surface. The plastic assembling element includes an assembling surface, a first surface and a second surface. The assembling surface is for assembling the plastic assembling element to the light path folding element, wherein the assembling surface is physically contacted with the light path folding element. The first surface is disposed towards the light path folding element. The second surface is disposed towards the light path folding element, wherein the second surface and the first surface are disposed adjacent to each other. The second surface of the plastic assembling element and the optical reflecting surface of the light path folding element are correspondingly disposed. The second surface includes a protruding structure array, and the protruding structure array includes at least seven protruding structures arranged at equal intervals. Therefore, the present disclosure provides an imaging lens assembly module with light path folding function. The volume of the imaging lens assembly module can be reduced by the arrangement of the light path folding element, which is favorable for applying on telephoto imaging systems. The optical reflecting surface of the light path folding element is an interface that easily forms the stray light. It is favorable for eliminating the stray light formed in specific areas by disposing a special matting structure on the plastic assembling element to correspond to the optical reflecting surface of the light path folding element. The path of non-imaging light incident at large angles can be effectively destroyed by the arrangement of the protruding structure array. Therefore, the optical quality of the imaging lens assembly module can be enhanced.

Specifically, an optical axis of the imaging lens assembly module can travel through the light incident surface, the light exiting surface and the optical reflecting surface of the light path folding element. Therefore, the traveling direction of the optical axis of the imaging lens assembly module can be changed by the light path folding element. Further, the imaging light can be reflected by a high-reflective coating of the optical reflecting surface, or can be reflected by the phenomenon of a total internal reflection. Furthermore, the light path folding element can simultaneously have an optical reflecting surface with total internal reflection and an optical reflecting surface with the high-reflective coating.

The light path folding element can be positioned on the assembling surface in an abutting manner or by disposing a colloid on the assembling surface, but the present disclosure is not limited thereto.

The protruding structure array is regularly arranged at equal intervals on the second surface in a periodic pattern, can be arranged in an orthogonal two-dimensional array, or can be arranged in a non-orthogonal two-dimensional array, but the present disclosure is not limited thereto. A total number of the protruding structures can be ranged from hundreds to thousands. Microscopic structural details of the protruding structures can be observed by using optical tools, and the at least seven protruding structures are regularly arranged at equal intervals in the pattern of an array. It should be mentioned that the plastic assembling element of the present disclosure includes an extremely large number of the protruding structures. In the analysis, a local area is taken for measurement. By disposing a specific number of the protruding structures in the local area, the effect of eliminating the stray light formed in a specific area can be achieved. Hence, the total number of the protruding structures will not be focused on and discussed in the present disclosure.

Further, the imaging lens assembly module can further include a carrier. The carrier is for accommodating the light path folding element, and the plastic assembling element can be used to assemble the light path folding element into the carrier, but the present disclosure is not limited thereto.

The first surface of the plastic assembling element can be a matte surface, and the first surface and the optical reflecting surface of the light path folding element are correspondingly disposed. Therefore, molds with various surface structures can be provided, and the production efficiency of products can be enhanced. Specifically, the intensity of reflected light on the first surface can be reduced by transferring the roughened surface of the mold after matting to the first surface.

The first surface of the plastic assembling element is not physically contacted with the light path folding element. Therefore, the stability of the imaging light reflected by the optical reflecting surface can be maintained. In detail, by forming a gap between the first surface and the light path folding element, the mechanical interference between the plastic assembling element and the optical reflecting surface during the assembly of the plastic assembling element can be avoided.

The second surface of the plastic assembling element is not physically contacted with the light path folding element. Therefore, the mechanical interference generated during the assembly of the second surface can be prevented, and the damage to the protruding structure array can be avoided. In other words, by forming a gap between the second surface and the light path folding element, the mechanical interference between the plastic assembling element and the optical reflecting surface during the assembly of the plastic assembling element can be avoided.

The assembling surface of the plastic assembling element is disposed adjacent to the first surface. Therefore, the plastic assembling element with an assembly function and an optical function can be provided.

When a spacing distance between each two of the protruding structures adjacent to each other in the protruding structure array is t, the following condition is satisfied: $0.01\ mm<t<0.25\ mm$. Therefore, a higher-precision mold processing can be provided. Further, the following condition can be satisfied: $0.01\ mm<t<0.15\ mm$. Therefore, the efficiency of eliminating stray light can be enhanced.

When a height of each of the protruding structures is d, the following condition is satisfied: 0.001 mm≤d≤0.095 mm. Therefore, it is favorable for destroying the structural height condition of the stray light. It should be mentioned that the height of each of the protruding structures can be different due to manufacturing tolerances. Further, the following condition can be satisfied: 0.009 mm≤d≤0.065 mm. Therefore, the structural height condition for mass production can be satisfied. Furthermore, the following condition can be satisfied: 0.015 mm≤d≤0.065 mm. Therefore, a higher structural integrity can be provided.

The plastic assembling element can further include an opening structure. The opening structure and the light exiting surface of the light path folding element are correspondingly disposed, and the first surface can surround the opening structure. Therefore, the generation of additional non-imaging light can be avoided.

When a spacing distance between the second surface and the opening structure is Dh, and a spacing distance between the second surface and the light path folding element is Dp, the following condition is satisfied: 0≤Dh/Dp<6.3. Therefore, it is favorable for destroying the specific path of the stray light. Further, the following condition can be satisfied: 0≤Dh/Dp<4.8. Therefore, both the light-blocking effect and the product reliability can be achieved.

The plastic assembling element can further include at least three gate traces. Therefore, the feasibility of the mass production of the products can be provided. Specifically, the plastic assembling element can be integrally formed by an injection molding method.

When an area of the first surface within an area of the plastic assembling element is Af, and an area of the second surface within the area of the plastic assembling element is As, the following condition is satisfied: 0.05<As/Af<3.5. Therefore, a higher imaging quality can be provided, and the stray light can be effectively blocked. Further, the following condition can be satisfied: 0.09<As/Af<3.1.

The light path folding element can further include an abutting surface, and the abutting surface and the assembling surface of the plastic assembling element are assembled and abutted against each other. Therefore, an assembly spacing between the optical reflecting surface and the plastic assembling element can be maintained by controlling the dimensional accuracy.

A number of the protruding structures can be at least seventeen, and the protruding structures are regularly arranged at equal intervals. Therefore, a high-intensity stray light can be effectively destroyed by the arrangement of an array structure with a certain number density. Further, the number of the protruding structures can be at least twenty-nine, and the protruding structures are regularly arranged at equal intervals. Therefore, an array structure with a high-density can be provided.

The optical reflecting surface can be an optical total internal reflecting surface, and the optical reflecting surface is for proceeding a total internal reflection of an imaging light of the imaging lens assembly module in the light path folding element. By the optical design that utilizes the phenomenon of optical total internal reflection, the manufacturing cost can be reduced.

A number of the optical reflecting surface of the light path folding element can be at least two, and the optical reflecting surfaces are for reflecting the imaging light of the imaging lens assembly module. Therefore, the feasibility of miniaturization of optical imaging modules can be provided.

The present disclosure further provides a camera module including the aforementioned imaging lens assembly module and an image sensor, wherein the image sensor is disposed on an image surface of the imaging lens assembly module.

The present disclosure further provides an electronic device including the aforementioned camera module.

1st Example

Figure 1B:
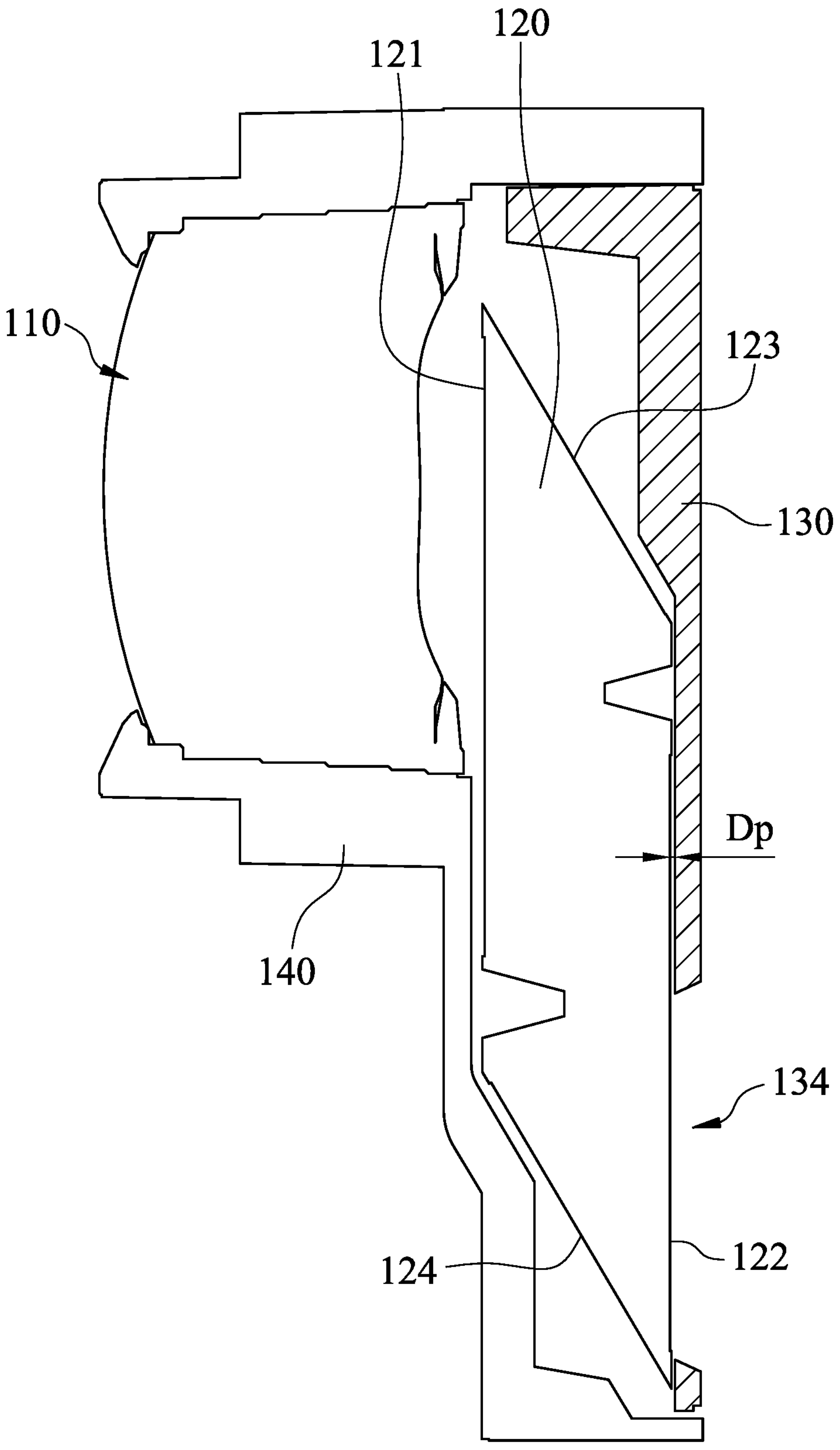
FIG. 1B is an assembling schematic view of the imaging lens assembly module according to the 1st example of FIG. 1A.

FIG. 1A is an exploded view of an imaging lens assembly module 100 according to the 1st example of the present disclosure. FIG. 1B is an assembling schematic view of the imaging lens assembly module 100 according to the 1st example of FIG. 1A. As shown in FIG. 1A and FIG. 1B, the imaging lens assembly module 100 includes an imaging lens assembly 110, a light path folding element 120 and a plastic assembling element 130. The light path folding element 120 is disposed on an image side of the imaging lens assembly 110, and the plastic assembling element 130 is assembled to the light path folding element 120. In the 1st example of FIG. 1A and FIG. 1B, the imaging lens assembly module 100 can further include a carrier 140, and the imaging lens assembly 110, the light path folding element 120 and the plastic assembling element 130 are disposed in the carrier 140 in order from an object side to an image side of the imaging lens assembly module 100, but the present disclosure is not limited thereto.

The imaging lens assembly 110 includes at least one optical lens element. Specifically, in the 1st example of FIG. 1A and FIG. 1B, the imaging lens assembly 110 includes a plurality of optical lens elements (its reference numeral is omitted), but the present disclosure is not limited thereto.

The light path folding element 120 is disposed on an image side of the optical lens elements, wherein the light path folding element 120 has four optical reflecting surfaces 121, 122, 123, 124, and the optical reflecting surfaces 121, 122, 123, 124 are for reflecting an imaging light of the imaging lens assembly module 100. Specifically, the light path folding element 120 has a light incident surface (that is, the optical reflecting surface 121), a light exiting surface (that is, the optical reflecting surface 122) and the two optical reflecting surfaces 123, 124. In the 1st example, both the optical reflecting surface 121 as the light incident surface and the optical reflecting surface 122 as the light exiting surface are optical total internal reflecting surfaces, which are for proceeding a total internal reflection of the imaging light of the imaging lens assembly module 100 in the light path folding element 120. It should be mentioned that the light incident surface is coplanar with the optical reflecting surface 121, and the light exiting surface is coplanar with the optical reflecting surface 122, but the present disclosure is not limited thereto.

Figure 1C:
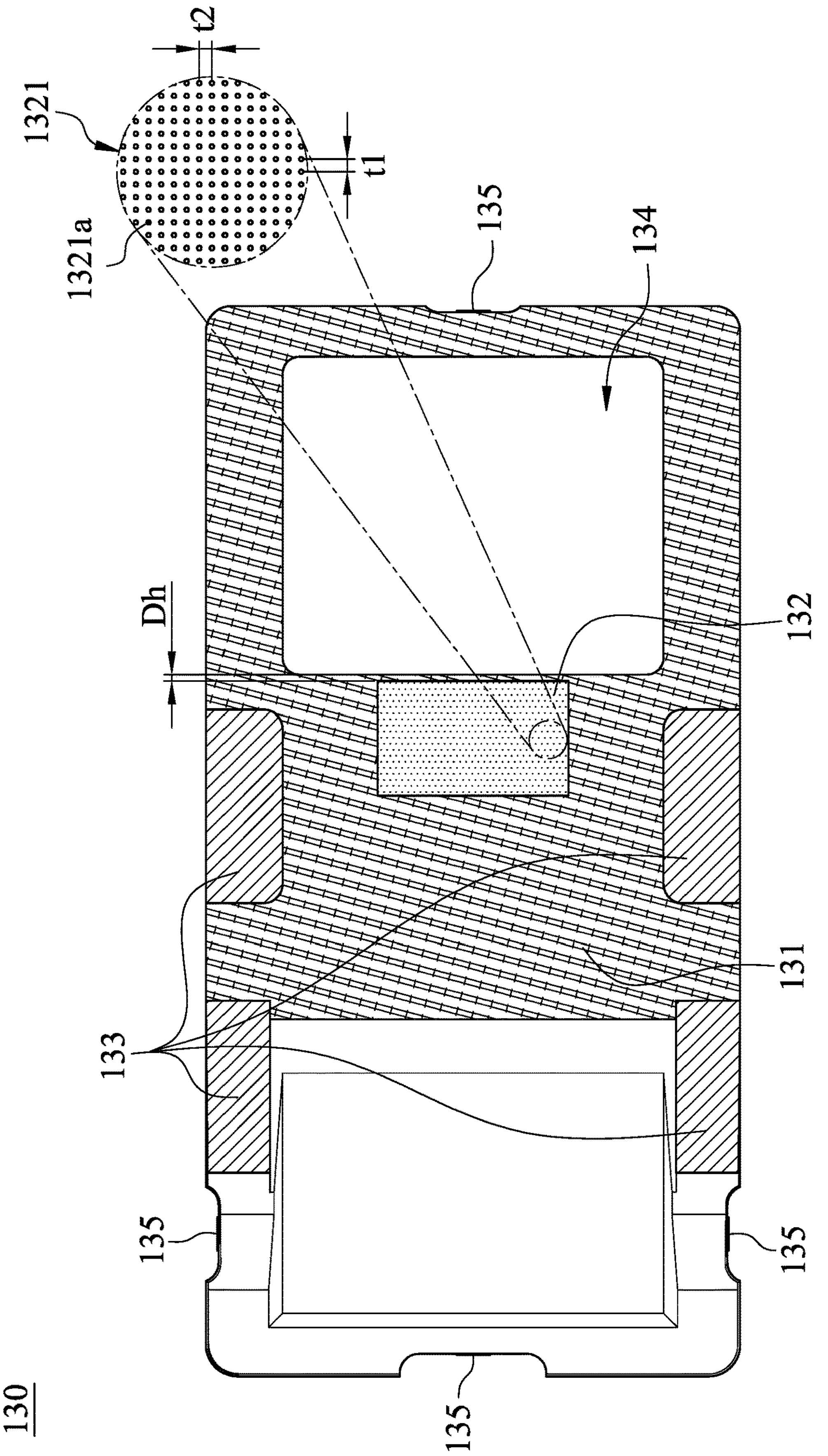
FIG. 1C is a plan view of the plastic assembling element of the imaging lens assembly module according to the 1st example of FIG. 1A.
Figure 1D:
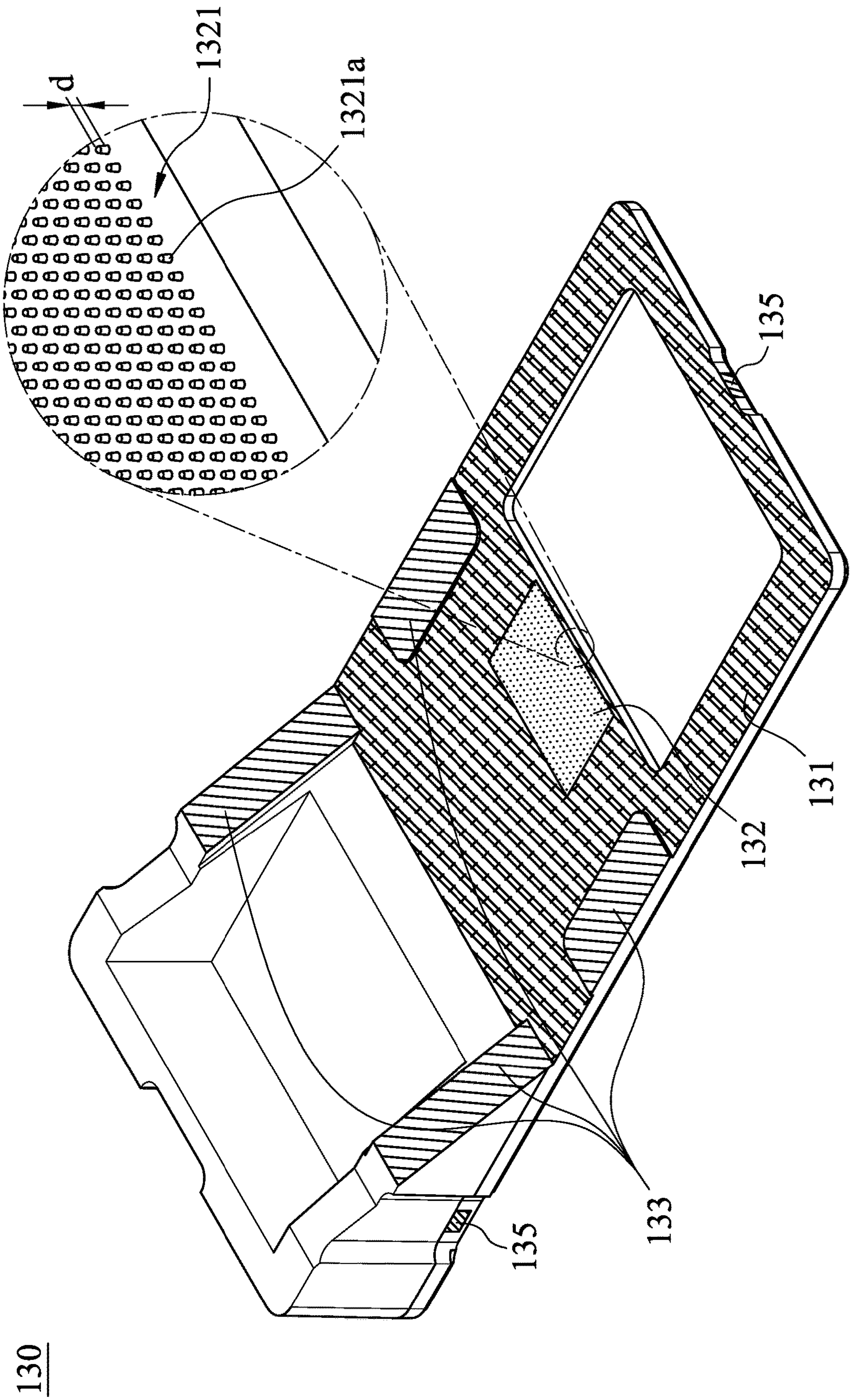
FIG. 1D is a three-dimensional schematic view of the plastic assembling element of the imaging lens assembly module according to the 1st example of FIG. 1A.

FIG. 1C is a plan view of the plastic assembling element 130 of the imaging lens assembly module 100 according to the 1st example of FIG. 1A. FIG. 1D is a three-dimensional schematic view of the plastic assembling element 130 of the imaging lens assembly module 100 according to the 1st example of FIG. 1A. The plastic assembling element 130 includes an assembling surface 133, a first surface 131 and a second surface 132. The assembling surface 133 is for assembling the plastic assembling element 130 to the light path folding element 120, wherein the assembling surface 133 is physically contacted with the light path folding element 120. Both the first surface 131 and the second surface 132 are disposed towards the light path folding element 120, and the second surface 132 and the first surface 131 are disposed adjacent to each other. The assembling surface 133 of the plastic assembling element 130 is disposed adjacent to the first surface 131. It should be mentioned that the assembling surface 133 is divided into four portions by the arrangement of the first surface 131; however, the assembling surface 133 is for assembling the plastic assembling element 130 to the light path folding element 120 and is physically contacted with the light path folding element 120. Hence, the four portions of the assembling surface 133 are regarded as a whole, and the four portions of the assembling surface 133 are collectively labeled as the assembling surface 133.

The first surface 131 of the plastic assembling element 130 can be a matte surface, and the first surface 131 and the optical reflecting surface 122 of the light path folding element 120 are correspondingly disposed. Further, the first surface 131 of the plastic assembling element 130 is not physically contacted with the light path folding element 120.

The second surface 132 includes a protruding structure array 1321, and the protruding structure array 1321 includes at least seven protruding structures **1321*a* arranged at equal intervals. Specifically, in the 1st example, a number of the protruding structures 1321*a* is 3400, but the present disclosure is not limited thereto. The second surface 132 of the plastic assembling element 130 is not physically contacted with the light path folding element 120. As defined in the present disclosure, the spacing distance between each two of the protruding structures adjacent to each other in the protruding structure array is t. As shown in FIG. 1C, in the protruding structure array 1321 of the 1st example, spacing distances between each two of the protruding structures 1321*a* can be t1 and t2 (that is, t=t1 or t2). In other words, the spacing distances between each two of the protruding structures 1321*a* can be defined as t1 and t2 along different directions, wherein t1=0.04 mm, and t2=0.04 mm. That is, in the 1st example, t=t1=t2. As shown in FIG. 1D, when a height of each of the protruding structures 1321*a*** is d, d=0.020 mm.

Further, the plastic assembling element 130 can further include an opening structure 134, and the opening structure 134 and the light exiting surface (that is, the optical reflecting surface 122) of the light path folding element 120 are correspondingly disposed. As shown in FIG. 1B and FIG. 1C, in the 1st example, when a spacing distance between the second surface 132 and the opening structure 134 is Dh, and a spacing distance between the second surface 132 and the light path folding element 120 is Dp, Dh=0.1 mm, Dp=0.07 mm, and Dh/Dp=1.429.

Furthermore, the plastic assembling element 130 can further include at least three gate traces 135. As shown in FIG. 1C, in the 1st example, the plastic assembling element 130 can further include four gate traces 135, but the present disclosure is not limited thereto.

In the 1st example, when an area of the first surface 131 within an area of the plastic assembling element 130 is Af, and an area of the second surface 132 within the area of the plastic assembling element 130 is As, Af=50.95 $mm^2$, As=5.45 $mm^2$, and As/Af=0.107.

Figure 1E:
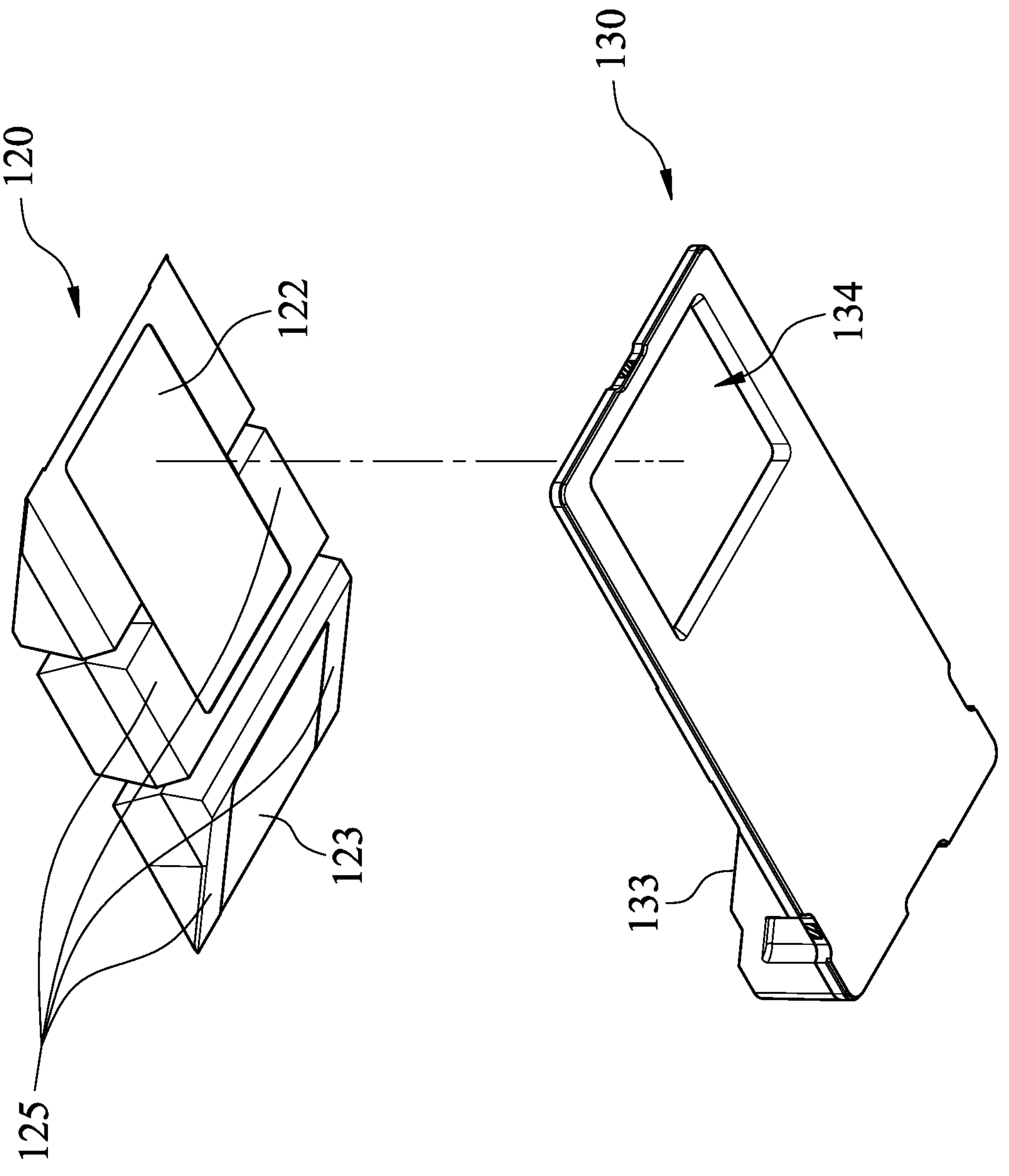
FIG. 1E is a schematic view of the light path folding element and the plastic assembling element according to the 1st example of FIG. 1A.

FIG. 1E is a schematic view of the light path folding element 120 and the plastic assembling element 130 according to the 1st example of FIG. 1A. As shown in FIG. 1D and FIG. 1E, the light path folding element 120 can further include an abutting surface 125, and the abutting surface 125 and the assembling surface 133 of the plastic assembling element 130 are assembled and abutted against each other. It should be mentioned that the abutting surface 125 is distributed around the optical reflecting surfaces 122, 123, and the abutting surface 125 and the assembling surface 133 correspond to each other. Hence, the abutting surface 125 and the assembling surface 133 are defined and labeled similarly, four portions of the abutting surface 125 are collectively labeled as the abutting surface 125, and the four portions of the abutting surface 125 are regarded as a whole.

2nd Example

Figure 2A:
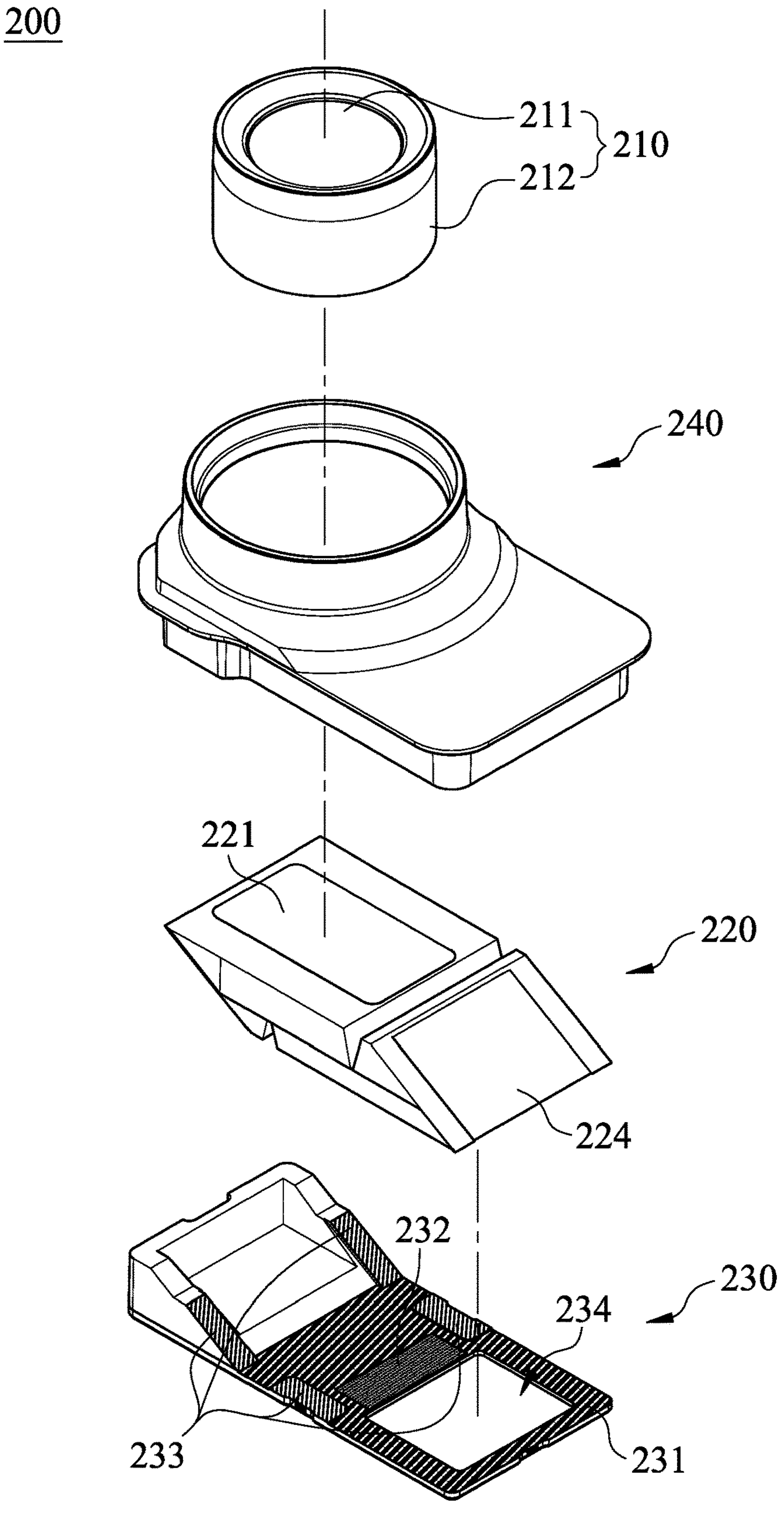
FIG. 2A is an exploded view of an imaging lens assembly module according to the 2nd example of the present disclosure.
Figure 2B:
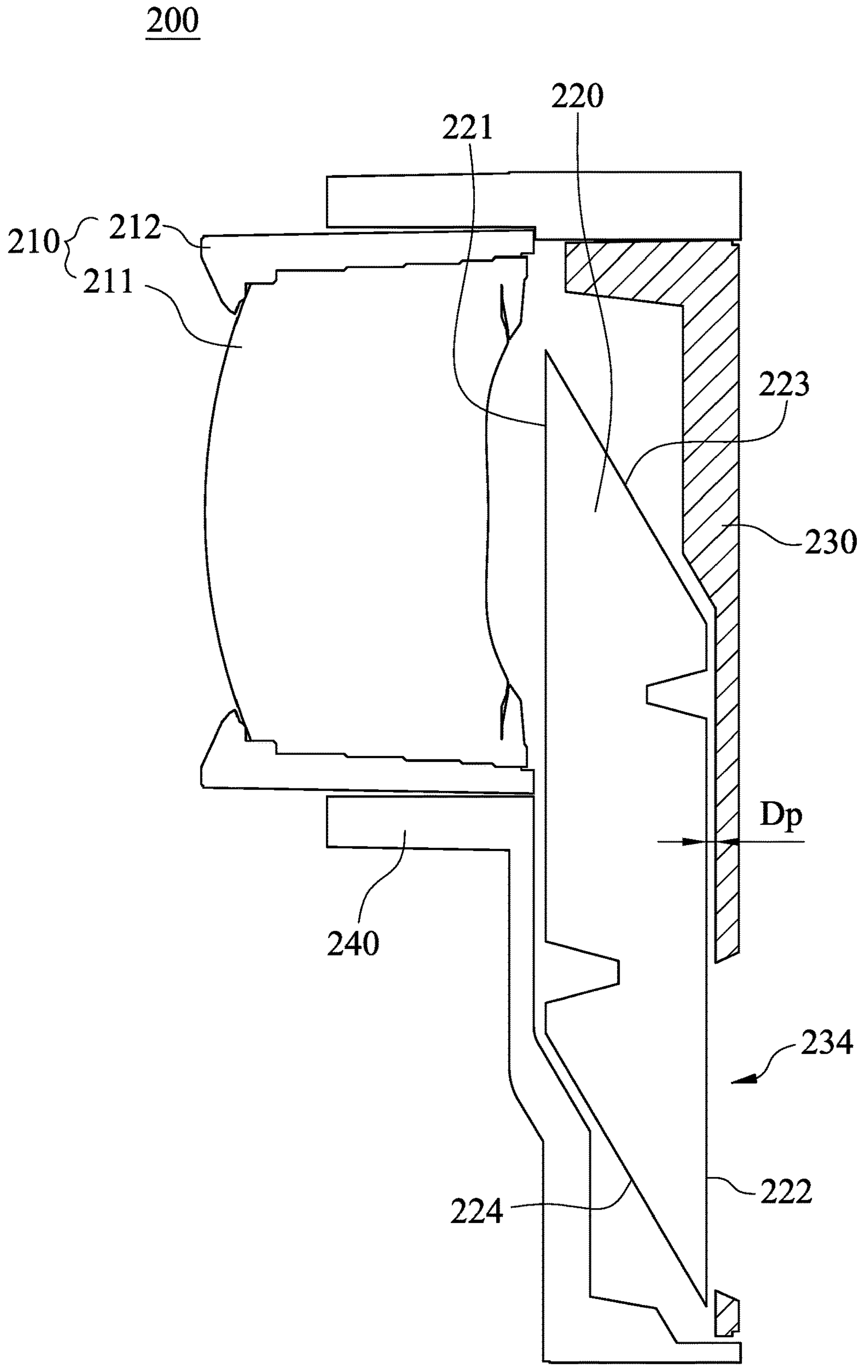
FIG. 2B is an assembling schematic view of the imaging lens assembly module according to the 2nd example of FIG. 2A.

FIG. 2A is an exploded view of an imaging lens assembly module 200 according to the 2nd example of the present disclosure. FIG. 2B is an assembling schematic view of the imaging lens assembly module 200 according to the 2nd example of FIG. 2A. As shown in FIG. 2A and FIG. 2B, the imaging lens assembly module 200 includes an imaging lens assembly 210, a light path folding element 220 and a plastic assembling element 230. The light path folding element 220 is disposed on an image side of the imaging lens assembly 210, and the plastic assembling element 230 is assembled to the light path folding element 220. In the 2nd example of FIG. 2A and FIG. 2B, the imaging lens assembly module 200 can further include a carrier 240, and the imaging lens assembly 210, the light path folding element 220 and the plastic assembling element 230 are disposed in the carrier 240 in order from an object side to an image side of the imaging lens assembly module 200, but the present disclosure is not limited thereto.

The imaging lens assembly 210 includes at least one optical lens element 211 and a lens barrel 212, wherein the optical lens element 211 is disposed in the lens barrel 212 and disposed on the carrier 240. Specifically, in the 2nd example of FIG. 2A and FIG. 2B, a number of the optical lens element 211 is plural, but the present disclosure is not limited thereto.

The light path folding element 220 is disposed on an image side of the optical lens elements 211, wherein the light path folding element 220 has four optical reflecting surfaces 221, 222, 223, 224, and the optical reflecting surfaces 221, 222, 223, 224 are for reflecting an imaging light of the imaging lens assembly module 200. Specifically, the light path folding element 220 has a light incident surface (that is, the optical reflecting surface 221), a light exiting surface (that is, the optical reflecting surface 222) and the two optical reflecting surfaces 223, 224. In the 2nd example, both the optical reflecting surface 221 as the light incident surface and the optical reflecting surface 222 as the light exiting surface are optical total internal reflecting surfaces, which are for proceeding a total internal reflection of the imaging light of the imaging lens assembly module 200 in the light path folding element 220. It should be mentioned that the light incident surface is coplanar with the optical reflecting surface 221, and the light exiting surface is coplanar with the optical reflecting surface 222, but the present disclosure is not limited thereto.

Figure 2C:
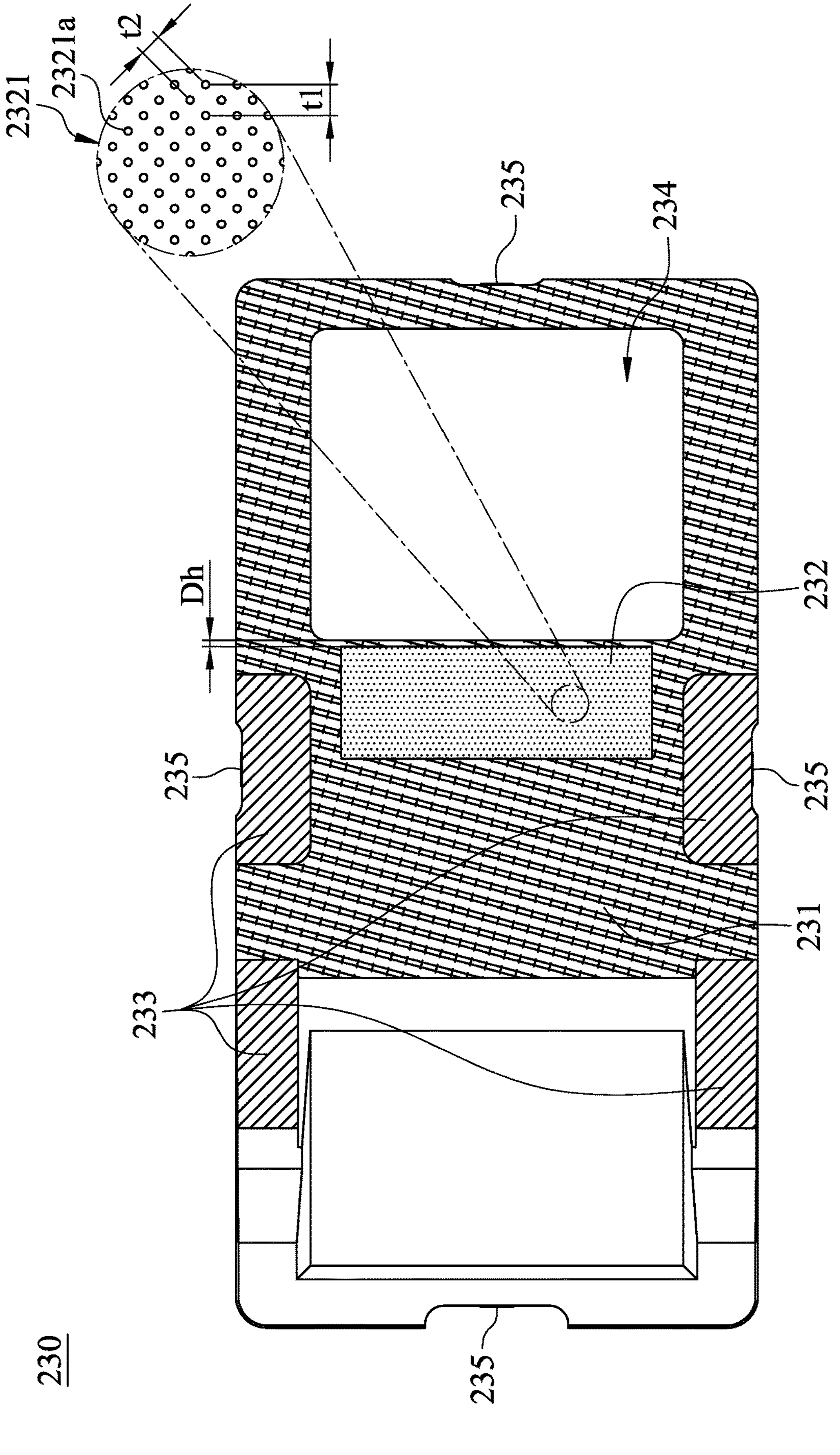
FIG. 2C is a plan view of the plastic assembling element of the imaging lens assembly module according to the 2nd example of FIG. 2A.
Figure 2D:
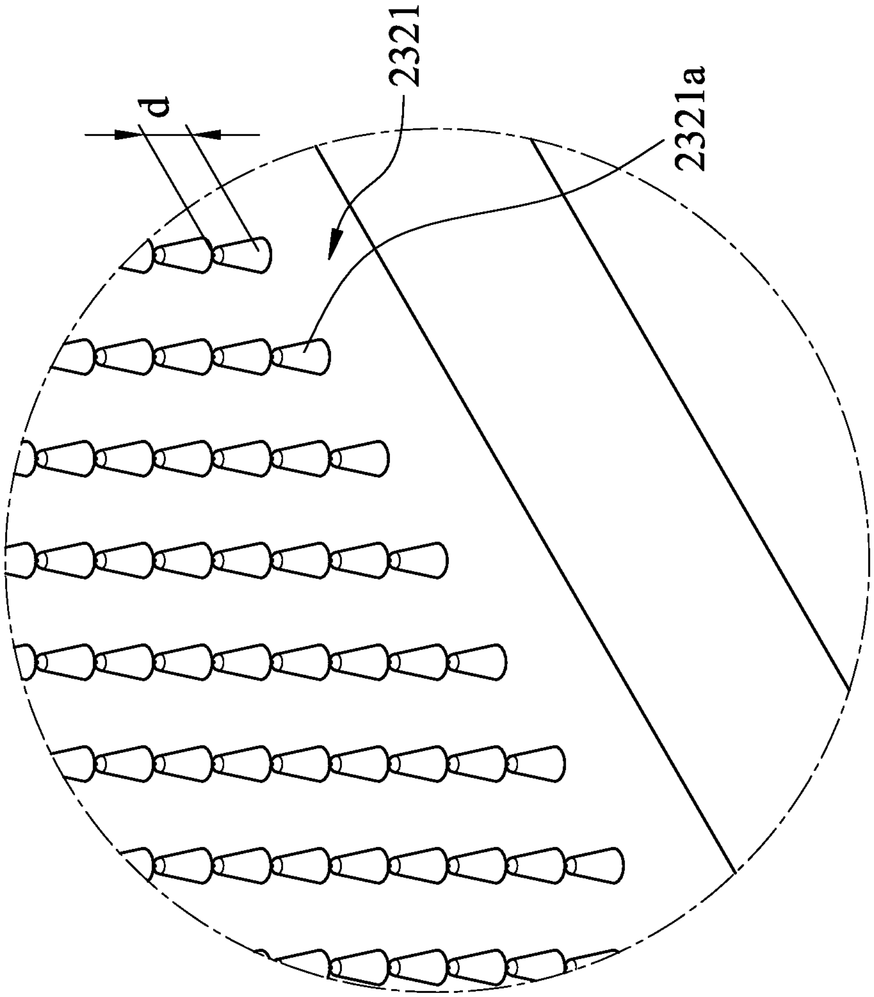
FIG. 2D is a three-dimensional schematic view of protruding structures of the plastic assembling element according to the 2nd example of FIG. 2C.

FIG. 2C is a plan view of the plastic assembling element 230 of the imaging lens assembly module 200 according to the 2nd example of FIG. 2A. FIG. 2D is a three-dimensional schematic view of protruding structures **2321*a* of the plastic assembling element 230 according to the 2nd example of FIG. 2C. The plastic assembling element 230 includes an assembling surface 233, a first surface 231 and a second surface 232. The assembling surface 233 is for assembling the plastic assembling element 230 to the light path folding element 220, wherein the assembling surface 233 is physically contacted with the light path folding element 220. Both the first surface 231 and the second surface 232 are disposed towards the light path folding element 220, and the second surface 232 and the first surface 231 are disposed adjacent to each other. The assembling surface 233 of the plastic assembling element 230 is disposed adjacent to the first surface 231. It should be mentioned that the assembling surface 233 is divided into four portions by the arrangement of the first surface 231; however, the assembling surface 233 is for assembling the plastic assembling element 230 to the light path folding element 220 and is physically contacted with the light path folding element 220. Hence, the four portions of the assembling surface 233 are regarded as a whole, and the four portions of the assembling surface 233 are collectively labeled as the assembling surface 233**.

The first surface 231 of the plastic assembling element 230 can be a matte surface, and the first surface 231 and the optical reflecting surface 222 of the light path folding element 220 are correspondingly disposed. Further, the first surface 231 of the plastic assembling element 230 is not physically contacted with the light path folding element 220.

The second surface 232 includes a protruding structure array 2321, and the protruding structure array 2321 includes at least seven protruding structures 2321*a* arranged at equal intervals. Specifically, in the 2nd example, a number of the protruding structures 2321*a* is 1800, but the present disclosure is not limited thereto. The second surface 232 of the plastic assembling element 230 is not physically contacted with the light path folding element 220. As defined in the present disclosure, the spacing distance between each two of the protruding structures adjacent to each other in the protruding structure array is t. As shown in FIG. 2C, in the protruding structure array 2321 of the 2nd example, spacing distances between each two of the protruding structures 2321*a* can be t1 and t2 (that is, t=t1 or t2). In other words, the spacing distances between each two of the protruding structures 2321*a* can be defined as t1 and t2 along different directions, wherein t1=0.1 mm, and t2=0.071 mm. As shown in FIG. 2D, when a height of each of the protruding structures 2321*a* is d, d=0.040 mm.

Further, the plastic assembling element 230 can further include an opening structure 234, and the opening structure 234 and the light exiting surface (that is, the optical reflecting surface 222) of the light path folding element 220 are correspondingly disposed. As shown in FIG. 2B and FIG. 2C, in the 2nd example, when a spacing distance between the second surface 232 and the opening structure 234 is Dh, and a spacing distance between the second surface 232 and the light path folding element 220 is Dp, Dh=0.1 mm, Dp=0.14 mm, and Dh/Dp=0.714.

Furthermore, the plastic assembling element 230 can further include at least three gate traces 235. As shown in FIG. 2C, in the 2nd example, the plastic assembling element 230 can further include four gate traces 235, but the present disclosure is not limited thereto.

In the 2nd example, when an area of the first surface 231 within an area of the plastic assembling element 230 is Af, and an area of the second surface 232 within the area of the plastic assembling element 230 is As, Af=47.35 $mm^2$, As=9.00 $mm^2$, and As/Af=0.190.

Figure 2E:
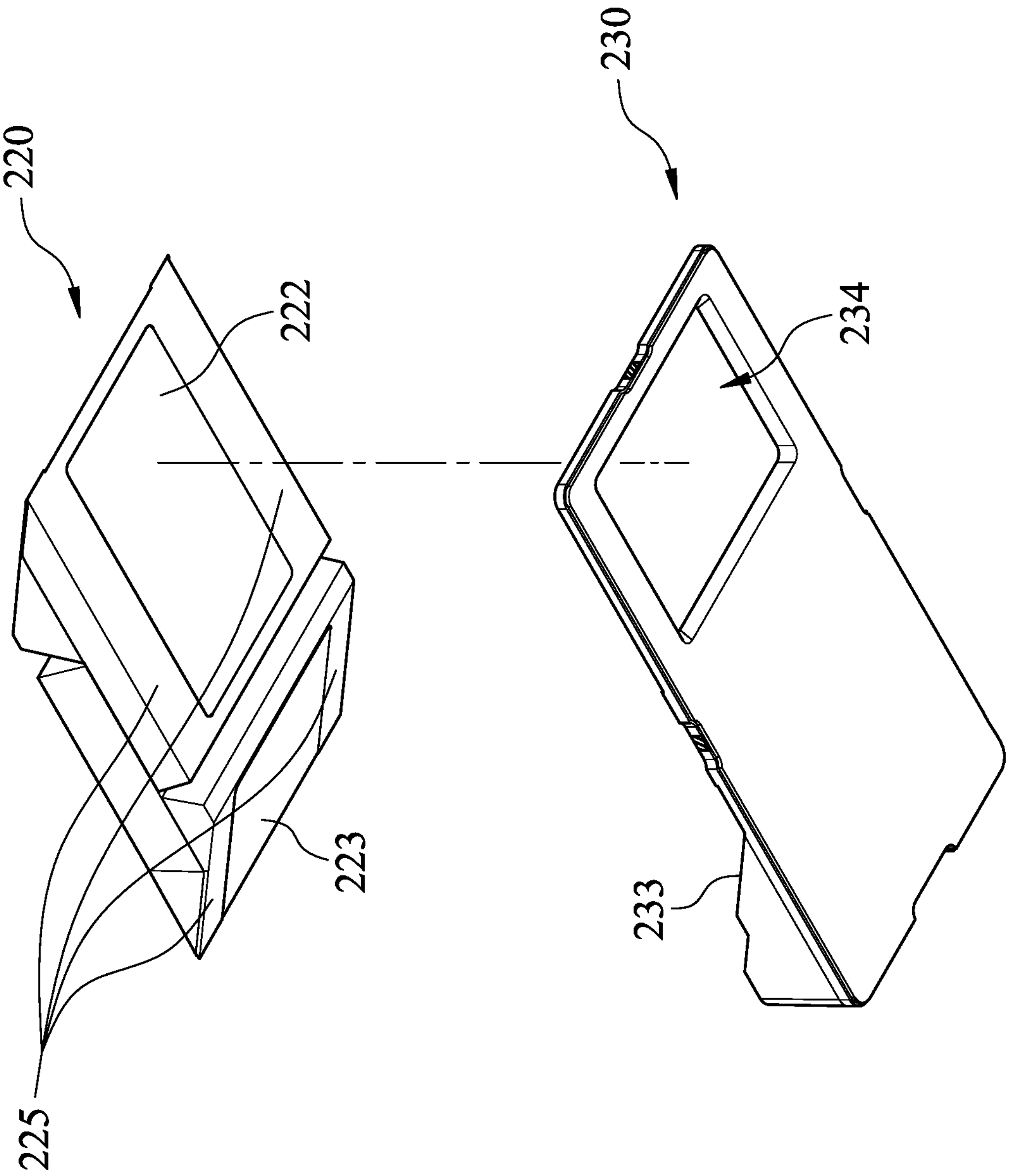
FIG. 2E is a schematic view of the light path folding element and the plastic assembling element according to the 2nd example of FIG. 2A.

FIG. 2E is a schematic view of the light path folding element 220 and the plastic assembling element 230 according to the 2nd example of FIG. 2A. As shown in FIG. 2A and FIG. 2E, the light path folding element 220 can further include an abutting surface 225, and the abutting surface 225 and the assembling surface 233 of the plastic assembling element 230 are assembled and abutted against each other. It should be mentioned that the abutting surface 225 is distributed around the optical reflecting surfaces 222, 223, and the abutting surface 225 and the assembling surface 233 correspond to each other. Hence, the abutting surface 225 and the assembling surface 233 are defined and labeled similarly, four portions of the abutting surface 225 are collectively labeled as the abutting surface 225, and the four portions of the abutting surface 225 are regarded as a whole.

3rd Example

Figure 3A:
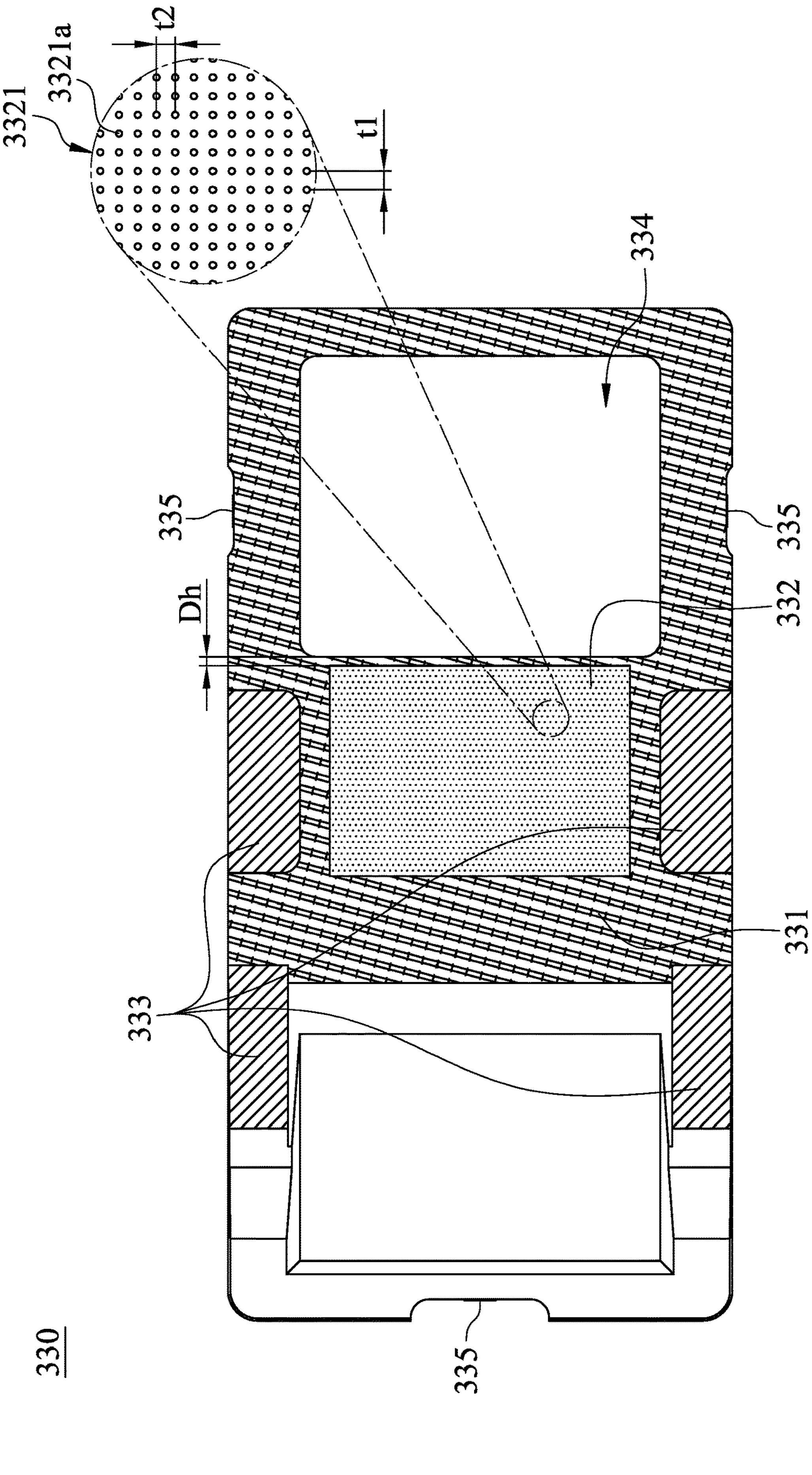
FIG. 3A is a plan view of a plastic assembling element of an imaging lens assembly module according to the 3rd example of the present disclosure.
Figure 3B:
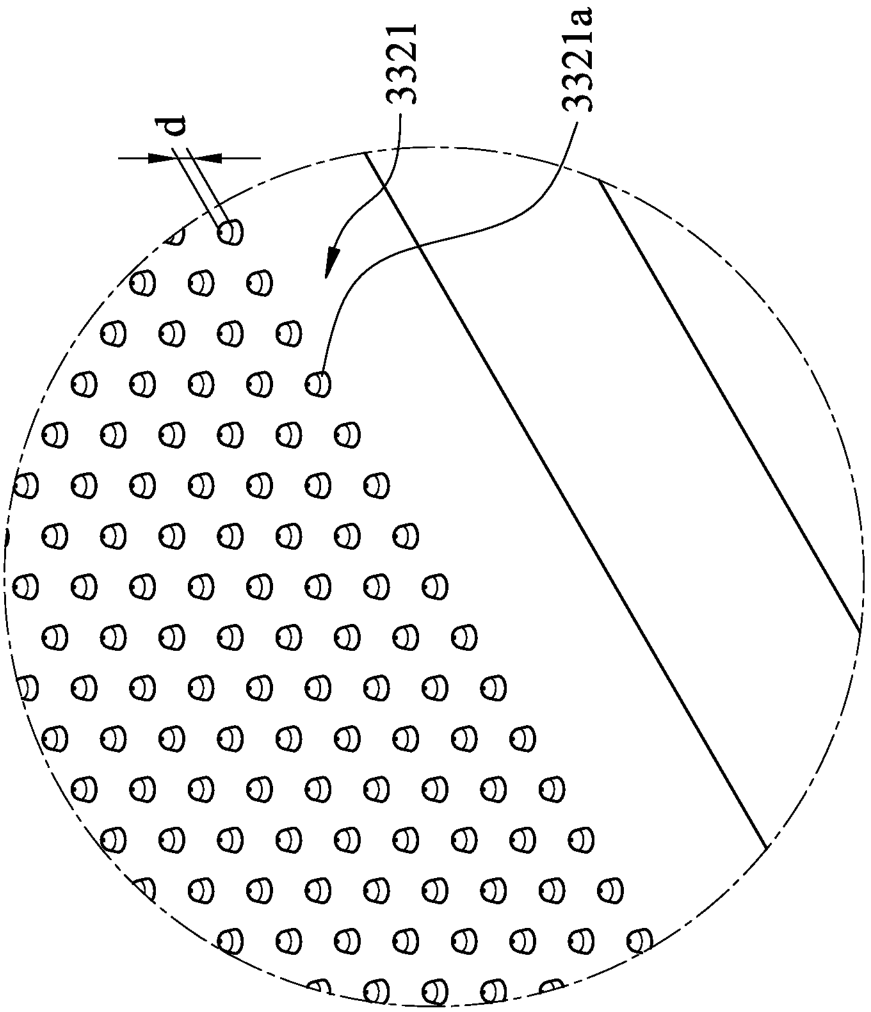
FIG. 3B is a three-dimensional schematic view of protruding structures of the plastic assembling element according to the 3rd example of FIG. 3A.

FIG. 3A is a plan view of a plastic assembling element 330 of an imaging lens assembly module according to the 3rd example of the present disclosure. FIG. 3B is a three-dimensional schematic view of protruding structures 3321*a* of the plastic assembling element 330 according to the 3rd example of FIG. 3A. First of all, it should be mentioned that the plastic assembling element 330 of the 3rd example can be assembled with the same or similar to the imaging lens assembly 110, the light path folding element 120 and the carrier 140 as the 1st example to form the imaging lens assembly module or can be assembled with the same or similar to the imaging lens assembly 210, the light path folding element 220 and the carrier 240 as the 2nd example to form the imaging lens assembly module, but the present disclosure is not limited thereto.

As shown in FIG. 3A, the plastic assembling element 330 includes an assembling surface 333, a first surface 331 and a second surface 332. The assembling surface 333 is for assembling the plastic assembling element 330 to the light path folding element, wherein the assembling surface 333 is physically contacted with the light path folding element. Both the first surface 331 and the second surface 332 are disposed towards the light path folding element, and the second surface 332 and the first surface 331 are disposed adjacent to each other. The assembling surface 333 of the plastic assembling element 330 is disposed adjacent to the first surface 331. It should be mentioned that the assembling surface 333 is divided into four portions by the arrangement of the first surface 331; however, the assembling surface 333 is for assembling the plastic assembling element 330 to the light path folding element and is physically contacted with the light path folding element. Hence, the four portions of the assembling surface 333 are regarded as a whole, and the four portions of the assembling surface 333 are collectively labeled as the assembling surface 333.

The first surface 331 of the plastic assembling element 330 can be a matte surface, and the first surface 331 and the optical reflecting surface of the light path folding element can be correspondingly disposed.

The second surface 332 includes a protruding structure array 3321, and the protruding structure array 3321 includes at least seven protruding structures 3321*a* arranged at equal intervals. Specifically, in the 3rd example, a number of the protruding structures 3321*a* is 7000, but the present disclosure is not limited thereto. The second surface 332 of the plastic assembling element 330 is not physically contacted with the light path folding element. As defined in the present disclosure, the spacing distance between each two of the protruding structures adjacent to each other in the protruding structure array is t. As shown in FIG. 3A, in the protruding structure array 3321 of the 3rd example, spacing distances between each two of the protruding structures 3321*a* can be t1 and t2 (that is, t=t1 or t2). In other words, the spacing distances between each two of the protruding structures 3321*a* can be defined as t1 and t2 along different directions, wherein t1=0.05 mm, and t2=0.05 mm. That is, in the 3rd example, t=t1=t2. As shown in FIG. 3B, when a height of each of the protruding structures 3321*a* is d, d=0.009 mm.

Further, the plastic assembling element 330 can further include an opening structure 334, and the opening structure 334 and the light exiting surface of the light path folding element are correspondingly disposed. As shown in FIG. 3A, in the 3rd example, when a spacing distance between the second surface 332 and the opening structure 334 is Dh, and a spacing distance between the second surface 332 and the light path folding element is Dp (for example, the plastic assembling element 330 of the 3rd example is configured on the imaging lens assembly module 100 of the 1st example), Dh=0.15 mm, Dp=0.07 mm, and Dh/Dp=2.143.

Furthermore, the plastic assembling element 330 can further include at least three gate traces 335. As shown in FIG. 3A, in the 3rd example, the plastic assembling element 330 can further include three gate traces 335, but the present disclosure is not limited thereto.

In the 3rd example, when an area of the first surface 331 within an area of the plastic assembling element 330 is Af, and an area of the second surface 332 within the area of the plastic assembling element 330 is As, Af=38.72 $mm^2$, As=17.50 $mm^2$, and As/Af=0.452.

4th Example

Figure 4A:
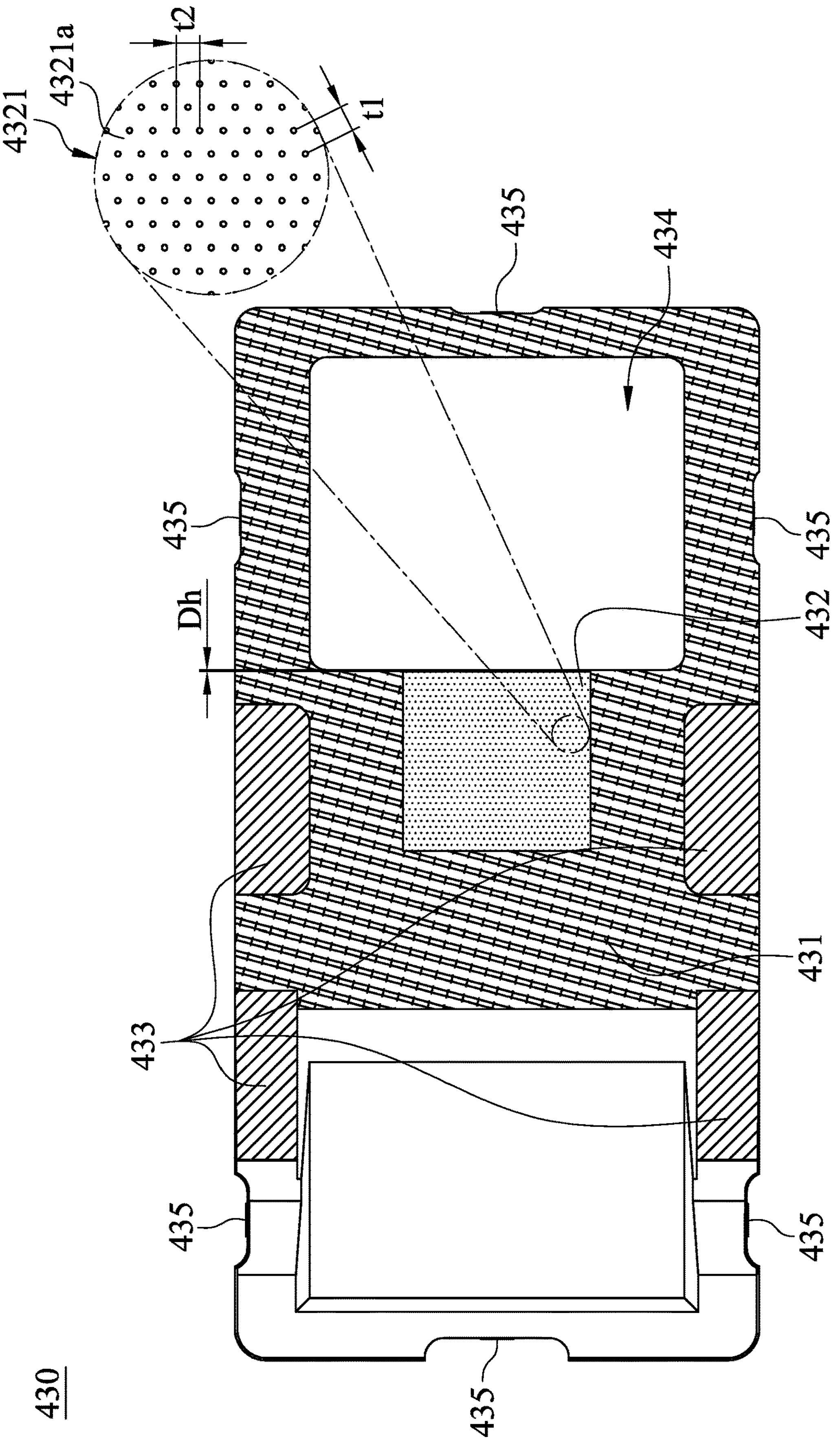
FIG. 4A is a plan view of a plastic assembling element of an imaging lens assembly module according to the 4th example of the present disclosure.
Figure 4B:
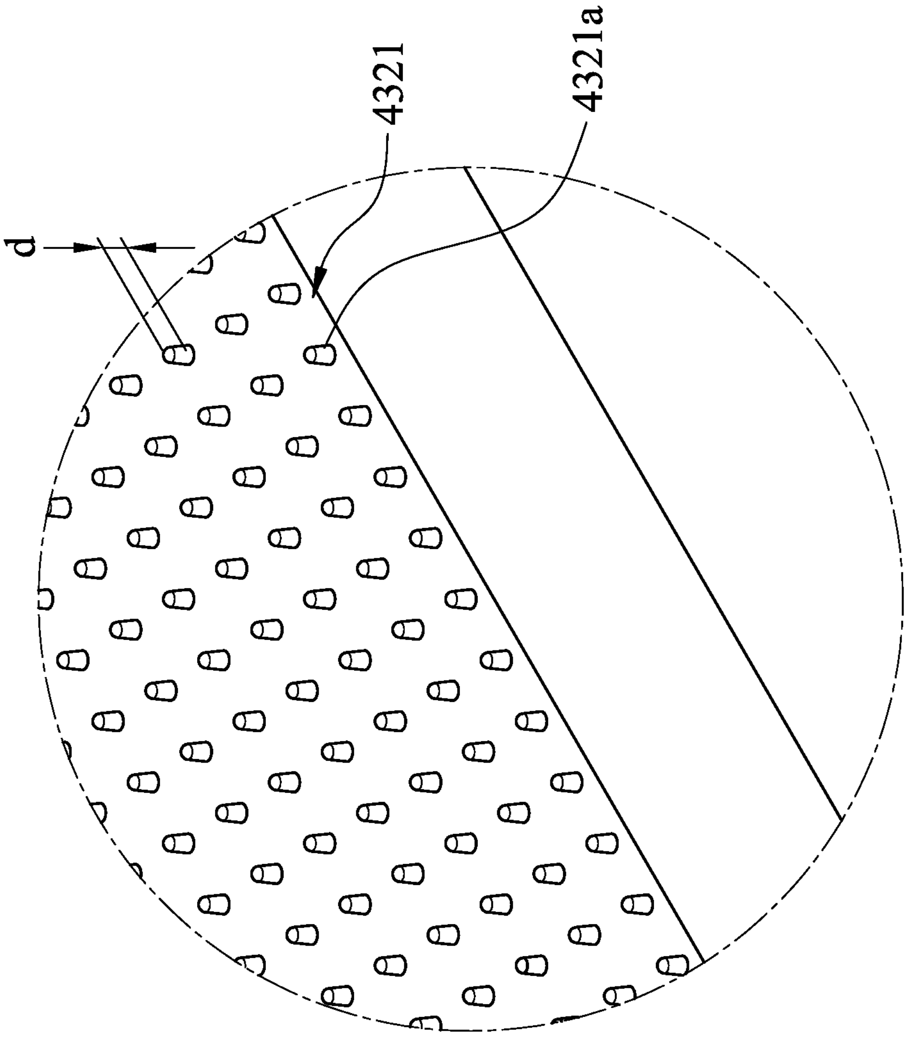
FIG. 4B is a three-dimensional schematic view of protruding structures of the plastic assembling element according to the 4th example of FIG. 4A.

FIG. 4A is a plan view of a plastic assembling element 430 of an imaging lens assembly module according to the 4th example of the present disclosure. FIG. 4B is a three-dimensional schematic view of protruding structures **4321*a* of the plastic assembling element 430 according to the 4th example of FIG. 4A. First of all, it should be mentioned that the plastic assembling element 430 of the 4th example can be assembled with the same or similar to the imaging lens assembly 110, the light path folding element 120 and the carrier 140 as the 1st example to form the imaging lens assembly module or can be assembled with the same or similar to the imaging lens assembly 210, the light path folding element 220 and the carrier 240** as the 2nd example to form the imaging lens assembly module, but the present disclosure is not limited thereto.

As shown in FIG. 4A, the plastic assembling element 430 includes an assembling surface 433, a first surface 431 and a second surface 432. The assembling surface 433 is for assembling the plastic assembling element 430 to the light path folding element, wherein the assembling surface 433 is physically contacted with the light path folding element. Both the first surface 431 and the second surface 432 are disposed towards the light path folding element, and the second surface 432 and the first surface 431 are disposed adjacent to each other. The assembling surface 433 of the plastic assembling element 430 is disposed adjacent to the first surface 431. It should be mentioned that the assembling surface 433 is divided into four portions by the arrangement of the first surface 431; however, the assembling surface 433 is for assembling the plastic assembling element 430 to the light path folding element and is physically contacted with the light path folding element. Hence, the four portions of the assembling surface 433 are regarded as a whole, and the four portions of the assembling surface 433 are collectively labeled as the assembling surface 433.

The first surface 431 of the plastic assembling element 430 can be a matte surface, and the first surface 431 and the optical reflecting surface of the light path folding element can be correspondingly disposed.

The second surface 432 includes a protruding structure array 4321, and the protruding structure array 4321 includes at least seven protruding structures **4321*a* arranged at equal intervals. Specifically, in the 4th example, a number of the protruding structures 4321*a* is 2400, but the present disclosure is not limited thereto. The second surface 432 of the plastic assembling element 430 is not physically contacted with the light path folding element. As defined in the present disclosure, the spacing distance between each two of the protruding structures adjacent to each other in the protruding structure array is t. As shown in FIG. 4A, in the protruding structure array 4321 of the 4th example, spacing distances between each two of the protruding structures 4321*a* can be t1 and t2 (that is, t=t1 or t2). In other words, the spacing distances between each two of the protruding structures 4321*a* can be defined as t1 and t2 along different directions, wherein t1=0.0067 mm, and t2=0.06 mm. As shown in FIG. 4B, when a height of each of the protruding structures 4321*a*** is d, d=0.025 mm.

Further, the plastic assembling element 430 can further include an opening structure 434, and the opening structure 434 and the light exiting surface of the light path folding element are correspondingly disposed. As shown in FIG. 4A, in the 4th example, when a spacing distance between the second surface 432 and the opening structure 434 is Dh, and a spacing distance between the second surface 432 and the light path folding element is Dp (for example, the plastic assembling element 430 of the 4th example is configured on the imaging lens assembly module 100 of the 1st example), Dh=0.02 mm, Dp=0.15 mm, and Dh/Dp=0.133.

Furthermore, the plastic assembling element 430 can further include at least three gate traces 435. As shown in FIG. 4A, in the 4th example, the plastic assembling element 430 can further include six gate traces 435, but the present disclosure is not limited thereto.

In the 4th example, when an area of the first surface 431 within an area of the plastic assembling element 430 is Af, and an area of the second surface 432 within the area of the plastic assembling element 430 is As, Af=47.44 $mm^2$, As=8.64 $mm^2$, and As/Af=0.182.

5th Example

Figure 5A:
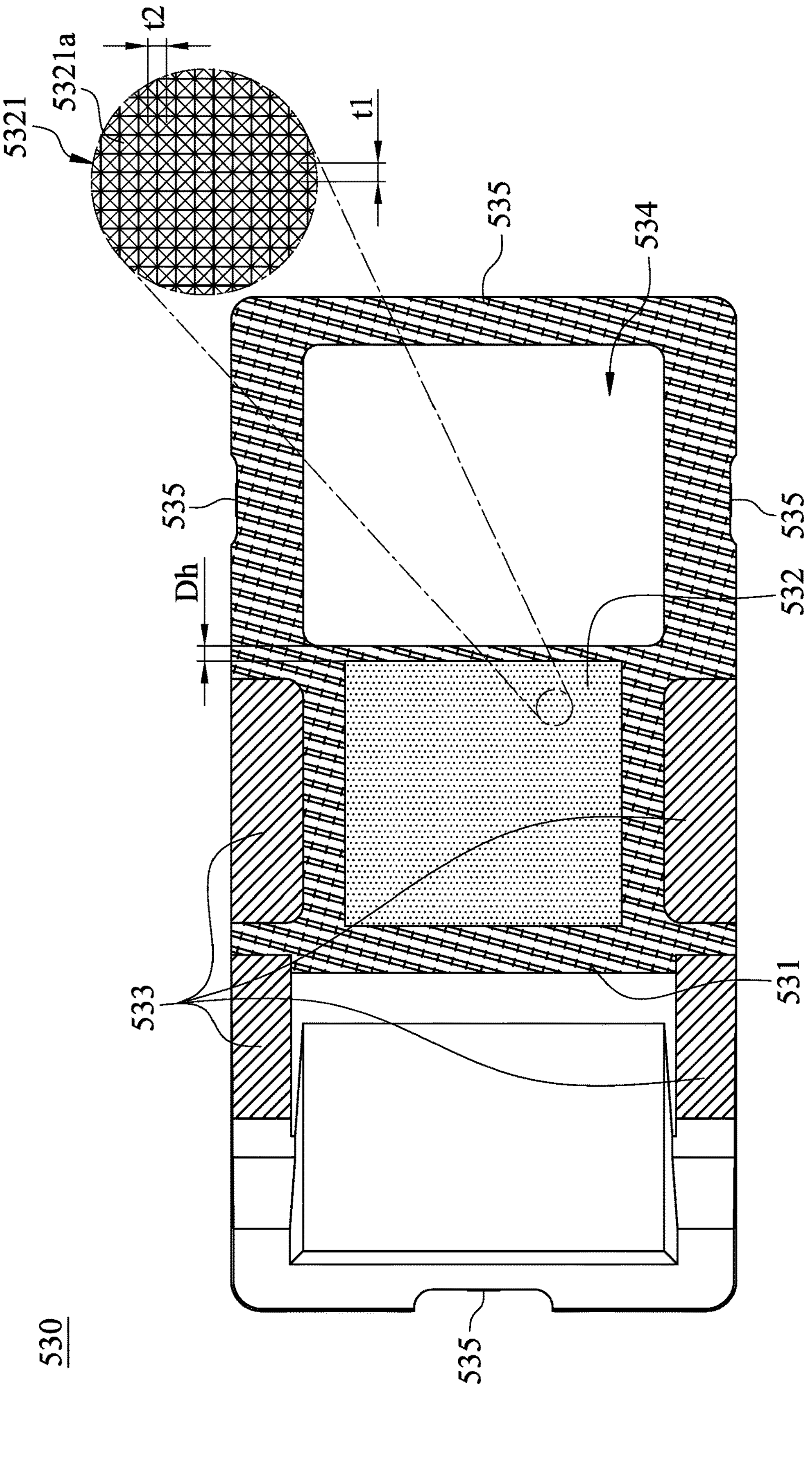
FIG. 5A is a plan view of a plastic assembling element of an imaging lens assembly module according to the 5th example of the present disclosure.
Figure 5B:
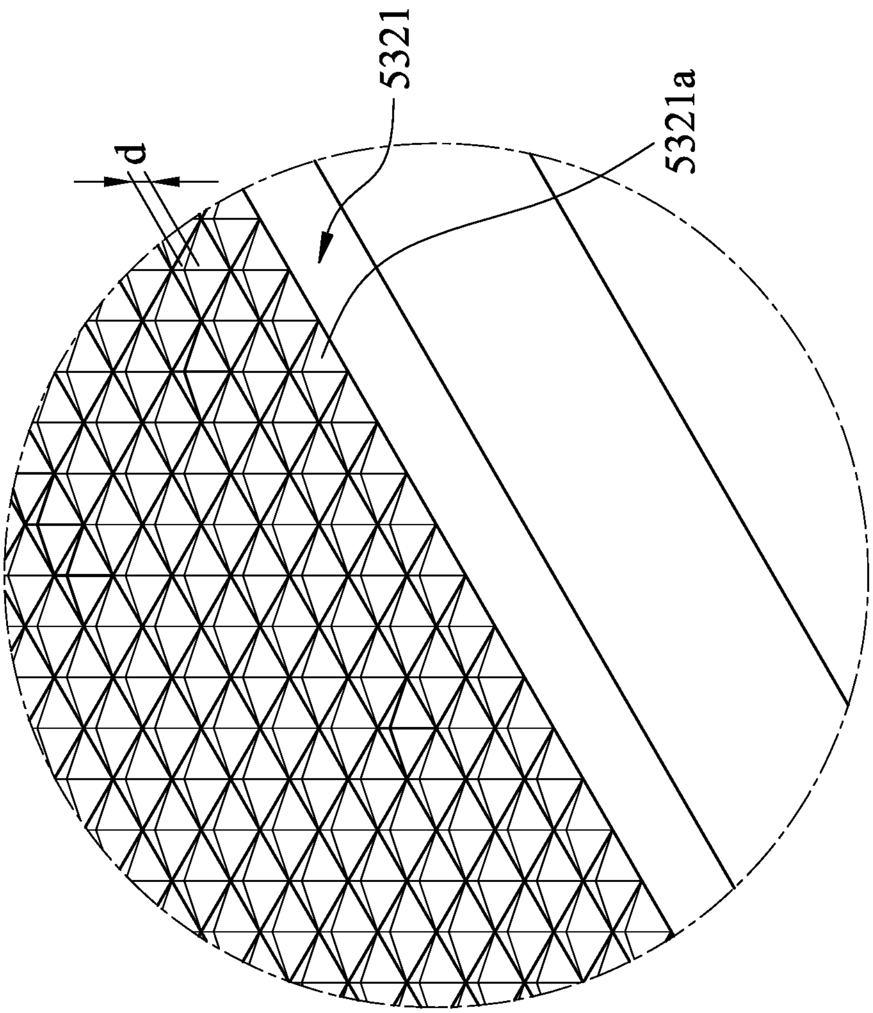
FIG. 5B is a three-dimensional schematic view of protruding structures of the plastic assembling element according to the 5th example of FIG. 5A.

FIG. 5A is a plan view of a plastic assembling element 530 of an imaging lens assembly module according to the 5th example of the present disclosure. FIG. 5B is a three-dimensional schematic view of protruding structures **5321*a* of the plastic assembling element 530 according to the 5th example of FIG. 5A. First of all, it should be mentioned that the plastic assembling element 530 of the 5th example can be assembled with the same or similar to the imaging lens assembly 110, the light path folding element 120 and the carrier 140 as the 1st example to form the imaging lens assembly module or can be assembled with the same or similar to the imaging lens assembly 210, the light path folding element 220 and the carrier 240** as the 2nd example to form the imaging lens assembly module, but the present disclosure is not limited thereto.

As shown in FIG. 5A, the plastic assembling element 530 includes an assembling surface 533, a first surface 531 and a second surface 532. The assembling surface 533 is for assembling the plastic assembling element 530 to the light path folding element, wherein the assembling surface 533 is physically contacted with the light path folding element. Both the first surface 531 and the second surface 532 are disposed towards the light path folding element, and the second surface 532 and the first surface 531 are disposed adjacent to each other. The assembling surface 533 of the plastic assembling element 530 is disposed adjacent to the first surface 531. It should be mentioned that the assembling surface 533 is divided into four portions by the arrangement of the first surface 531; however, the assembling surface 533 is for assembling the plastic assembling element 530 to the light path folding element and is physically contacted with the light path folding element. Hence, the four portions of the assembling surface 533 are regarded as a whole, and the four portions of the assembling surface 533 are collectively labeled as the assembling surface 533.

The first surface 531 of the plastic assembling element 530 can be a matte surface, and the first surface 531 and the optical reflecting surface of the light path folding element can be correspondingly disposed.

The second surface 532 includes a protruding structure array 5321, and the protruding structure array 5321 includes at least seven protruding structures 5321*a* arranged at equal intervals. Specifically, in the 5th example, a number of the protruding structures 5321*a* is 8000, but the present disclosure is not limited thereto. The second surface 532 of the plastic assembling element 530 is not physically contacted with the light path folding element. As defined in the present disclosure, the spacing distance between each two of the protruding structures adjacent to each other in the protruding structure array is t. As shown in FIG. 5A, in the protruding structure array 5321 of the 5th example, spacing distances between each two of the protruding structures 5321*a* can be t1 and t2 (that is, t=t1 or t2). In other words, the spacing distances between each two of the protruding structures 5321*a* can be defined as t1 and t2 along different directions, wherein t1=0.050 mm, and t2=0.050 mm. That is, in the 5th example, t=t1=t2. As shown in FIG. 5B, when a height of each of the protruding structures 5321*a* is d, d=0.016 mm. It should be mentioned that the spacing distance t1 and the spacing distance t2 between each two of the protruding structures 5321*a* are center distances between each two of the protruding structures 5321*a*.

Further, the plastic assembling element 530 can further include an opening structure 534, and the opening structure 534 and the light exiting surface of the light path folding element are correspondingly disposed. As shown in FIG. 5A, in the 5th example, when a spacing distance between the second surface 532 and the opening structure 534 is Dh, and a spacing distance between the second surface 532 and the light path folding element is Dp (for example, the plastic assembling element 530 of the 5th example is configured on the imaging lens assembly module 100 of the 1st example), Dh=0.25 mm, Dp=0.06 mm, and Dh/Dp=4.167.

Furthermore, the plastic assembling element 530 can further include at least three gate traces 535. As shown in FIG. 5A, in the 5th example, the plastic assembling element 530 can further include four gate traces 535, but the present disclosure is not limited thereto.

In the 5th example, when an area of the first surface 531 within an area of the plastic assembling element 530 is Af, and an area of the second surface 532 within the area of the plastic assembling element 530 is As, Af=33.58 $mm^2$, As=20.24 $mm^2$, and As/Af=0.603.

6th Example

Figure 6A:
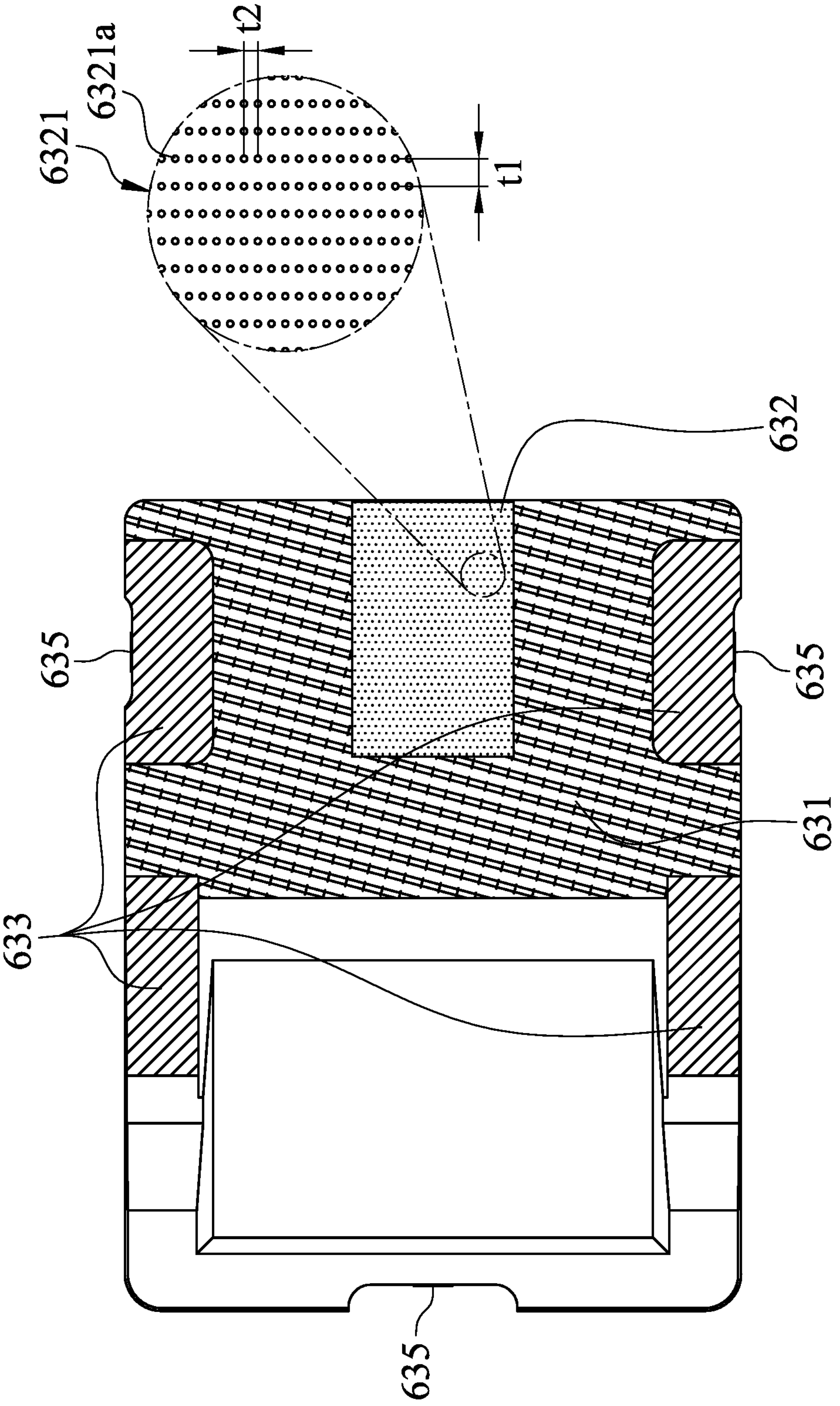
FIG. 6A is a plan view of a plastic assembling element of an imaging lens assembly module according to the 6th example of the present disclosure.
Figure 6B:
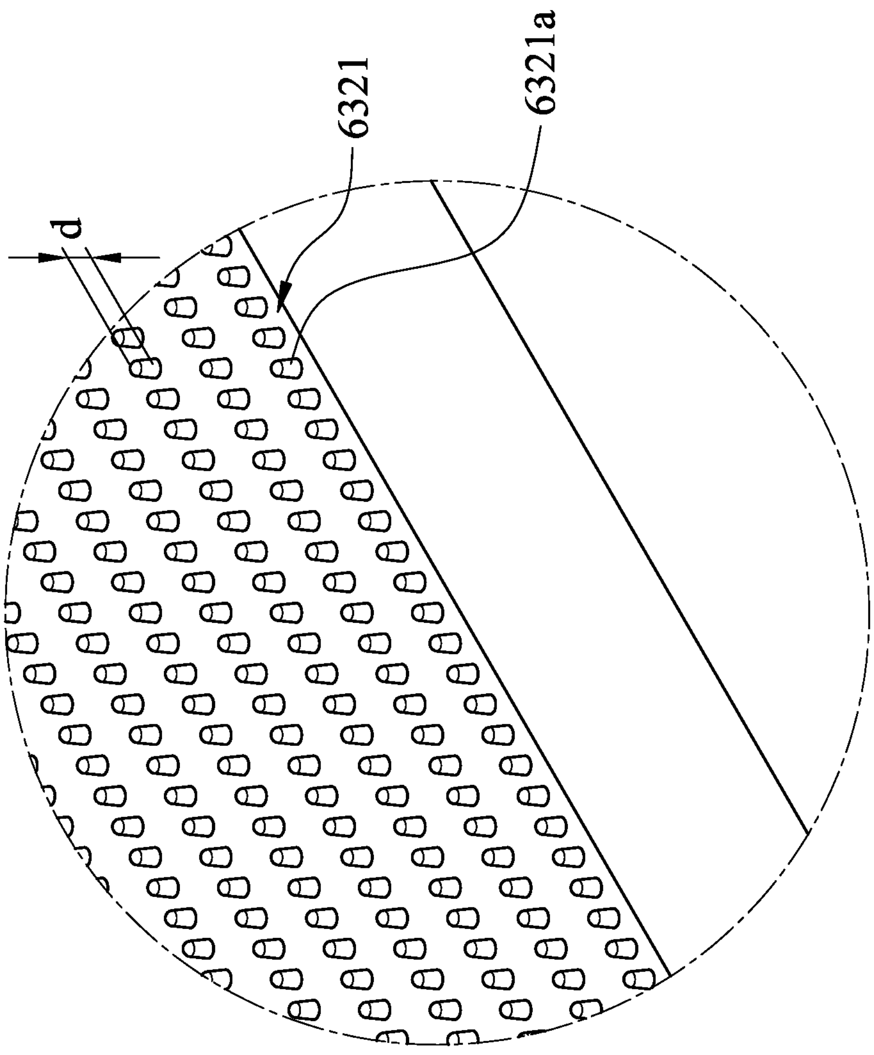
FIG. 6B is a three-dimensional schematic view of protruding structures of the plastic assembling element according to the 6th example of FIG. 6A.

FIG. 6A is a plan view of a plastic assembling element 630 of an imaging lens assembly module according to the 6th example of the present disclosure. FIG. 6B is a three-dimensional schematic view of protruding structures 6321*a* of the plastic assembling element 630 according to the 6th example of FIG. 6A. First of all, it should be mentioned that the plastic assembling element 630 of the 6th example can be assembled with the same or similar to the imaging lens assembly 110, the light path folding element 120 and the carrier 140 as the 1st example to form the imaging lens assembly module or can be assembled with the same or similar to the imaging lens assembly 210, the light path folding element 220 and the carrier 240 as the 2nd example to form the imaging lens assembly module, but the present disclosure is not limited thereto.

As shown in FIG. 6A, the plastic assembling element 630 includes an assembling surface 633, a first surface 631 and a second surface 632. The assembling surface 633 is for assembling the plastic assembling element 630 to the light path folding element, wherein the assembling surface 633 is physically contacted with the light path folding element. Both the first surface 631 and the second surface 632 are disposed towards the light path folding element, and the second surface 632 and the first surface 631 are disposed adjacent to each other. The assembling surface 633 of the plastic assembling element 630 is disposed adjacent to the first surface 631. It should be mentioned that the assembling surface 633 is divided into four portions by the arrangement of the first surface 631; however, the assembling surface 633 is for assembling the plastic assembling element 630 to the light path folding element and is physically contacted with the light path folding element. Hence, the four portions of the assembling surface 633 are regarded as a whole, and the four portions of the assembling surface 633 are collectively labeled as the assembling surface 633.

The first surface 631 of the plastic assembling element 630 can be a matte surface, and the first surface 631 and the optical reflecting surface of the light path folding element can be correspondingly disposed.

The second surface 632 includes a protruding structure array 6321, and the protruding structure array 6321 includes at least seven protruding structures 6321*a* arranged at equal intervals. Specifically, in the 6th example, a number of the protruding structures 6321*a* is 4200, but the present disclosure is not limited thereto. The second surface 632 of the plastic assembling element 630 is not physically contacted with the light path folding element. As defined in the present disclosure, the spacing distance between each two of the protruding structures adjacent to each other in the protruding structure array is t. As shown in FIG. 6A, in the protruding structure array 6321 of the 6th example, spacing distances between each two of the protruding structures 6321*a* can be t1 and t2 (that is, t=t1 or t2). In other words, the spacing distance between each two of the protruding structures 6321*a* can be defined as t1 and t2 along different directions, wherein t1=0.06 mm, and t2=0.03 mm. As shown in FIG. 6B, when a height of each of the protruding structures 6321*a* is d, d=0.03 mm.

Furthermore, the plastic assembling element 630 can further include at least three gate traces 635. As shown in FIG. 6A, in the 6th example, the plastic assembling element 630 can further include three gate traces 635, but the present disclosure is not limited thereto.

In the 6th example, when an area of the first surface 631 within an area of the plastic assembling element 630 is Af, and an area of the second surface 632 within the area of the plastic assembling element 630 is As, Af=30.05 $mm^2$, As=7.66 $mm^2$, and As/Af=0.255.

7th Example

Figure 7A:
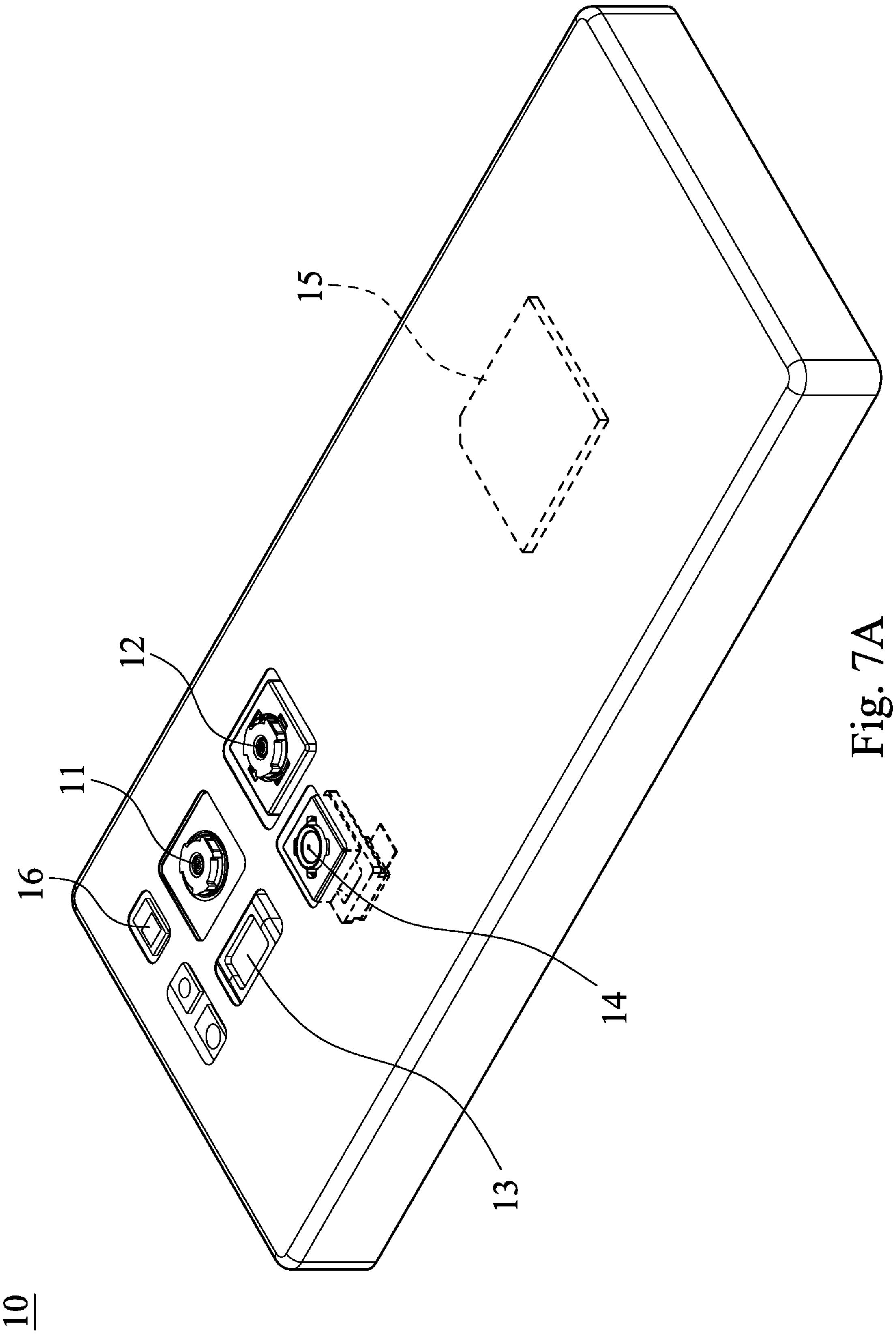
FIG. 7A is a schematic view of an electronic device according to the 7th example of the present disclosure.
Figure 7B:
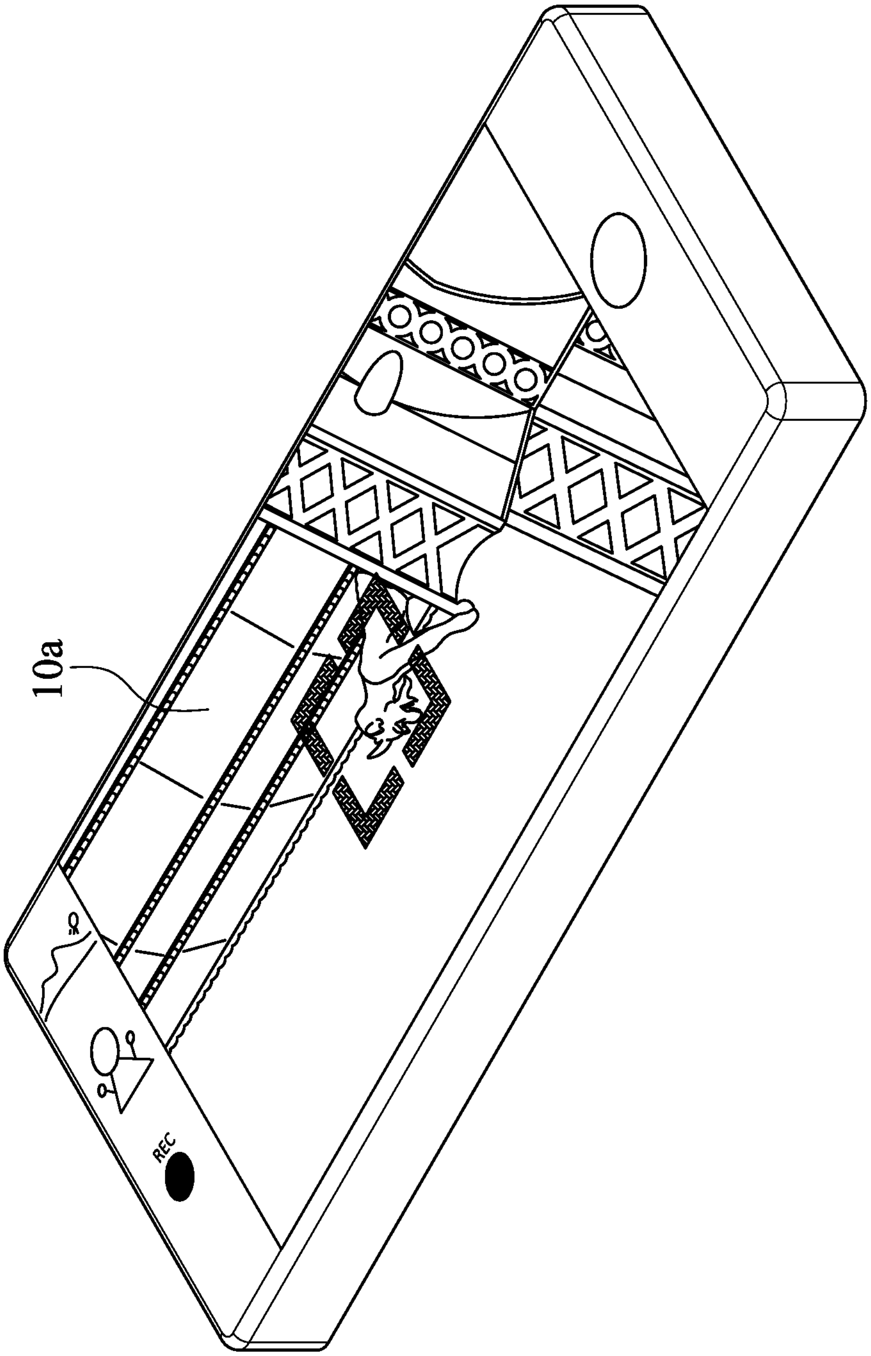
FIG. 7B is another schematic view of the electronic device according to the 7th example of FIG. 7A.

FIG. 7A is a schematic view of an electronic device 10 according to the 7th example of the present disclosure. FIG. 7B is another schematic view of the electronic device 10 according to the 7th example of FIG. 7A. As shown in FIG. 7A and FIG. 7B, the electronic device 10 is a smartphone. The electronic device 10 includes a plurality of camera modules and a user interface 10*a*. Further, the camera modules are a high resolution camera module 11, an ultrawide-angle camera module 12, and two telephoto camera modules 13, 14, and the user interface 10*a* is a touch screen, but the present disclosure is not limited thereto. Furthermore, the camera module includes the imaging lens assembly module according to any one of the 1st example to the 6th example and an image sensor (not shown), wherein the image sensor is disposed on an image surface of the imaging lens assembly module, but the present disclosure is not limited thereto.

A user enters a shooting mode via the user interface 10*a*, wherein the user interface 10*a* is used to display the screen, and the shooting angle can be manually adjusted to switch between different camera modules. At this moment, an imaging light is converged on one of the image sensors of the camera modules, and electronic signals associated with an image are output to an image signal processor (ISP) 15.

As shown in FIG. 7A, according to the camera specifications of the electronic device 10, the electronic device 10 can further include an optical anti-shake mechanism (not shown). Further, the electronic device 10 can further include at least one focusing assisting module (its reference numeral is omitted) and at least one sensing component (not shown). The focusing assisting module can be a flash module 16, an infrared distance measurement component, a laser focus module, etc. The flash module 16 is for compensating the color temperature. The sensing component can have functions for sensing physical momentum and kinetic energies, such as an accelerator, a gyroscope, and a Hall effect element, so as to sense shaking or jitters applied by hands of the user or external environments. Therefore, the autofocus function and the optical anti-shake mechanism of the camera modules disposed on the electronic device 10 can function to obtain a great imaging quality and facilitate the electronic device 10 according to the present disclosure to have a capturing function with multiple modes, such as taking optimized selfies, high dynamic range (HDR) with a low light source, 4K resolution recording, etc. Further, the user can visually see the captured image of the camera through the user interface 10*a* and manually operate the view finding range on the user interface 10*a* to achieve the auto focus function of what you see is what you get.

Furthermore, the camera modules, the optical anti-shake mechanism, the sensing component and the focusing assisting module can be disposed on a flexible printed circuit board (FPC) (not shown) and electrically connected to the image signal processor 15 and so on via a connector (not shown) so as to operate a picturing process. Recent electronic devices such as smartphones have a trend towards thinness and lightness. The camera modules and related elements are disposed on the flexible printed circuit board, and circuits are assembled into a main board of the electronic device by the connector. Hence, it can fulfill a mechanical design of a limited inner space of the electronic device and a requirement of a circuit layout and obtain a larger allowance, and it is also favorable for the autofocus functions of the camera modules obtaining a flexible control via a touch screen of the electronic device. In the 7th example, the electronic device 10 can include a plurality of the sensing components and a plurality of focusing assisting modules, and the sensing components and the focusing assisting modules are disposed on the flexible printed circuit board and another at least one flexible printed circuit board (not shown) and electrically connected to the image signal processor 15 and so on via corresponding connectors so as to operate the picturing process. In other examples (not shown), the sensing components and auxiliary optical elements can be disposed on the main board of the electronic device or a board of the other form according to the mechanical design and the requirement of the circuit layout.

Moreover, the electronic device 10 can further include, but not be limited to, a display, a control unit, a storage unit, a random-access memory (RAM), a read-only memory (ROM), or the combination thereof.

Figure 7C:
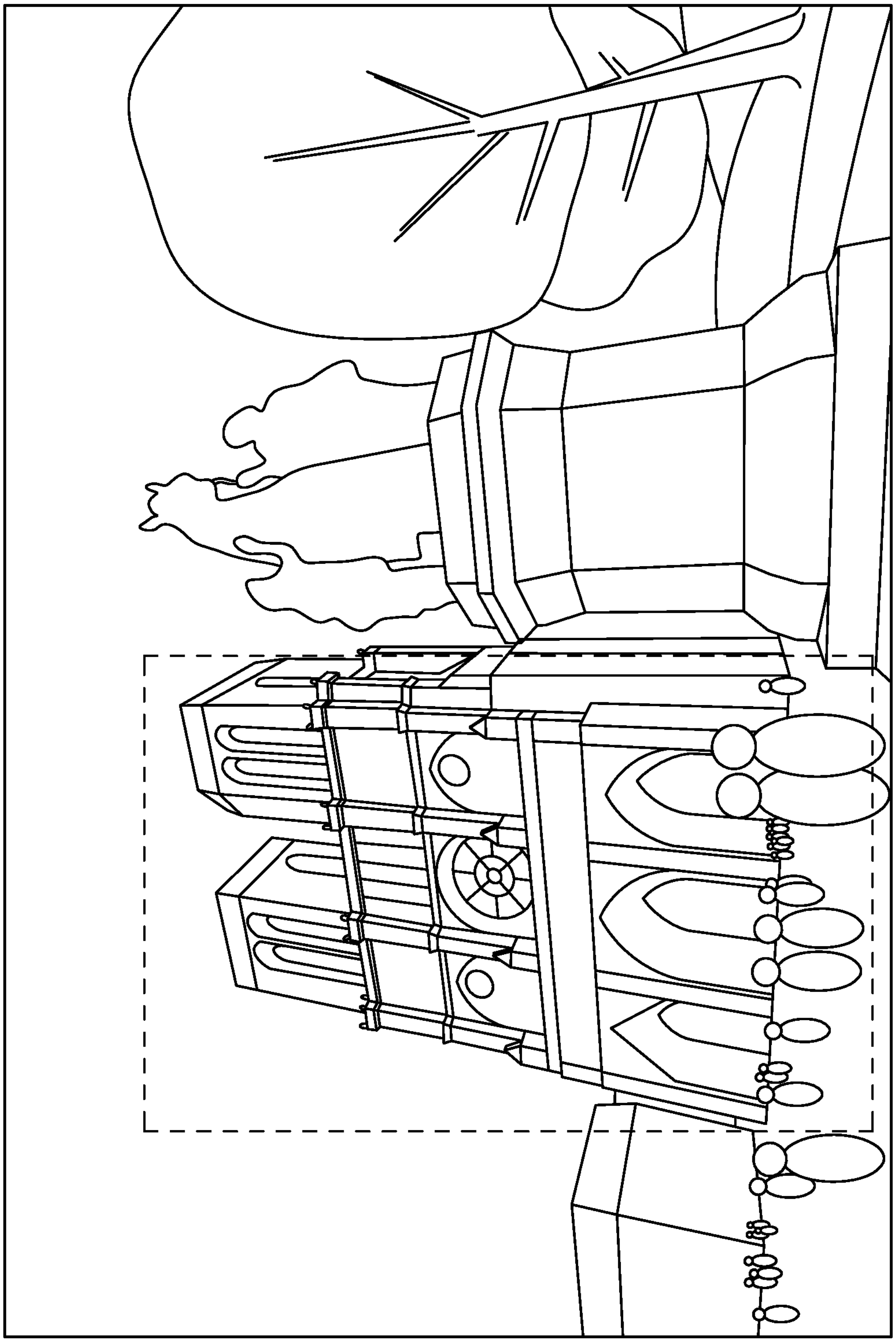
FIG. 7C is a schematic view of an image captured via the electronic device according to the 7th example of FIG. 7A.

FIG. 7C is a schematic view of an image captured via the electronic device 10 according to the 7th example of FIG. 7A. As shown in FIG. 7C, a larger ranged image can be captured via the ultra-wide-angle camera module 12, and the ultra-wide-angle camera module 12 has a function for containing more views.

Figure 7D:
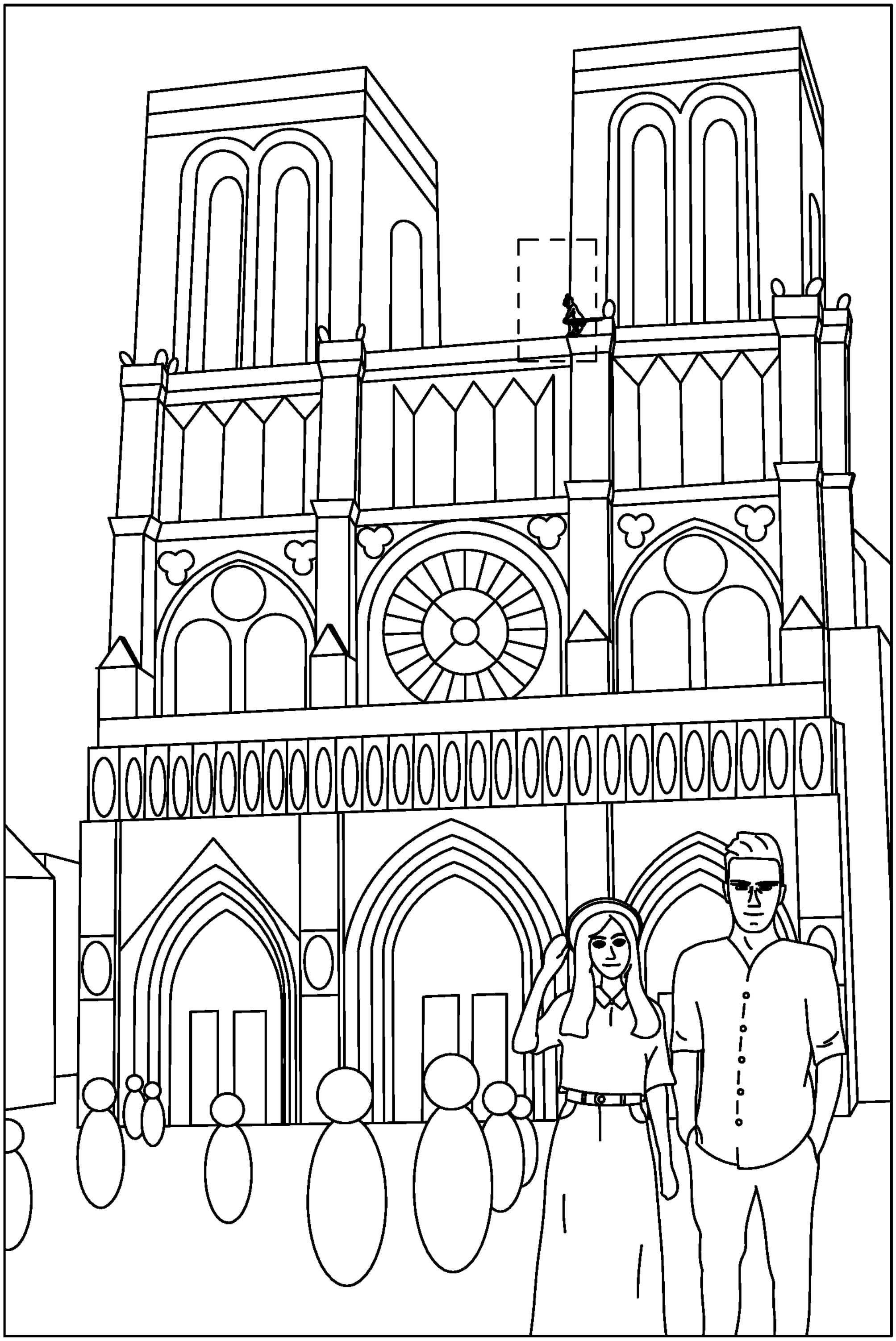
FIG. 7D is another schematic view of the image captured via the electronic device according to the 7th example of FIG. 7A.

FIG. 7D is another schematic view of the image captured via the electronic device 10 according to the 7th example of FIG. 7A. As shown in FIG. 7D, a certain ranged and high resolution image can be captured via the high resolution camera module 11, and the high resolution camera module 11 has a function for high resolution and low distortion.

Figure 7E:
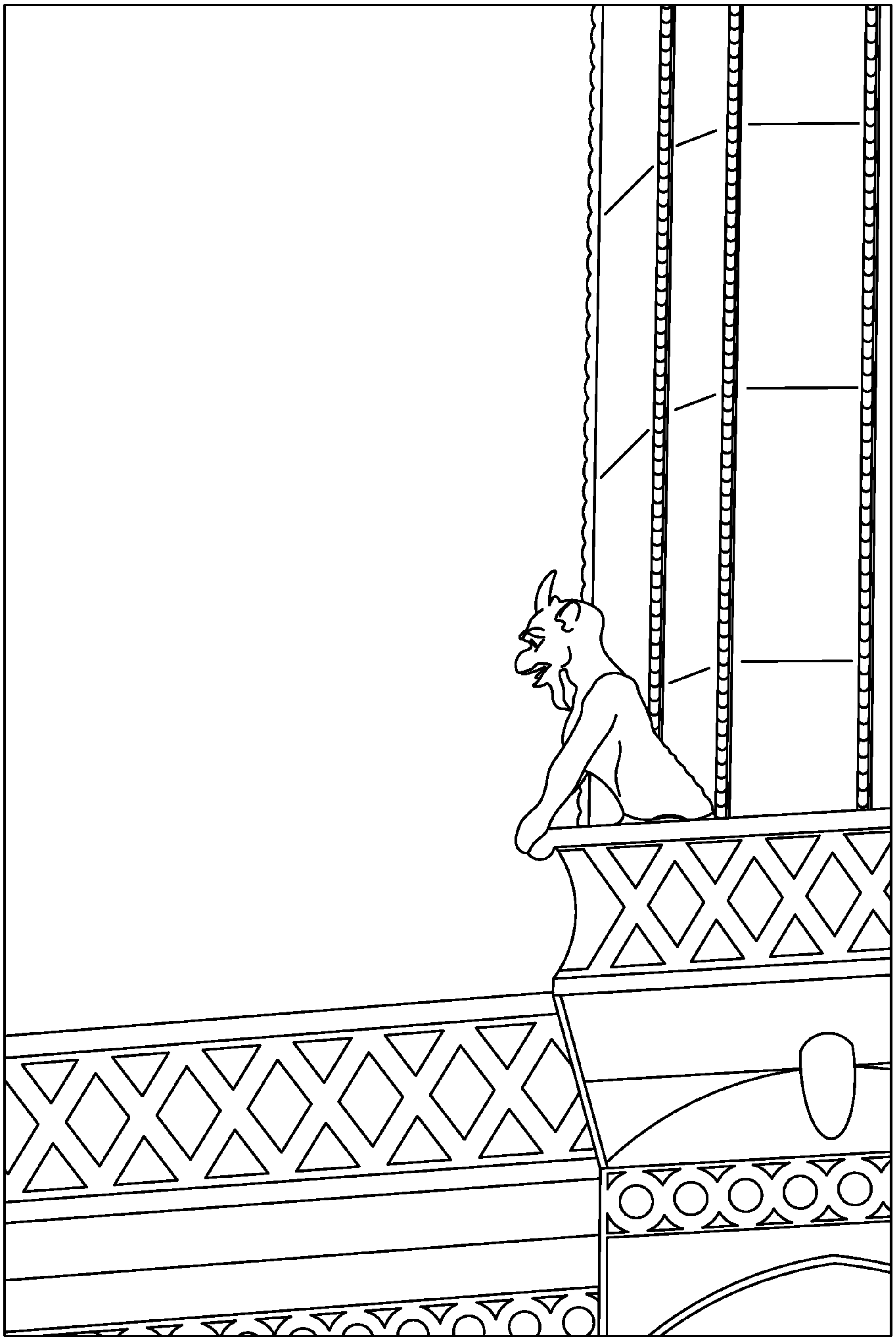
FIG. 7E is still another schematic view of the image captured via the electronic device according to the 7th example of FIG. 7A.

FIG. 7E is still another schematic view of the image captured via the electronic device 10 according to the 7th example of FIG. 7A. As shown in FIG. 7E, the telephoto camera modules 13, 14 have a function for a high magnification, and a far image can be captured and enlarged to a high magnification via the telephoto camera modules 13, 14.

As shown in FIG. 7C to FIG. 7E, when an image is captured via the camera modules having various focal lengths and processed via a technology of an image processing, a zoom function of the electronic device 10 can be achieved.

8th Example

Figure 8:
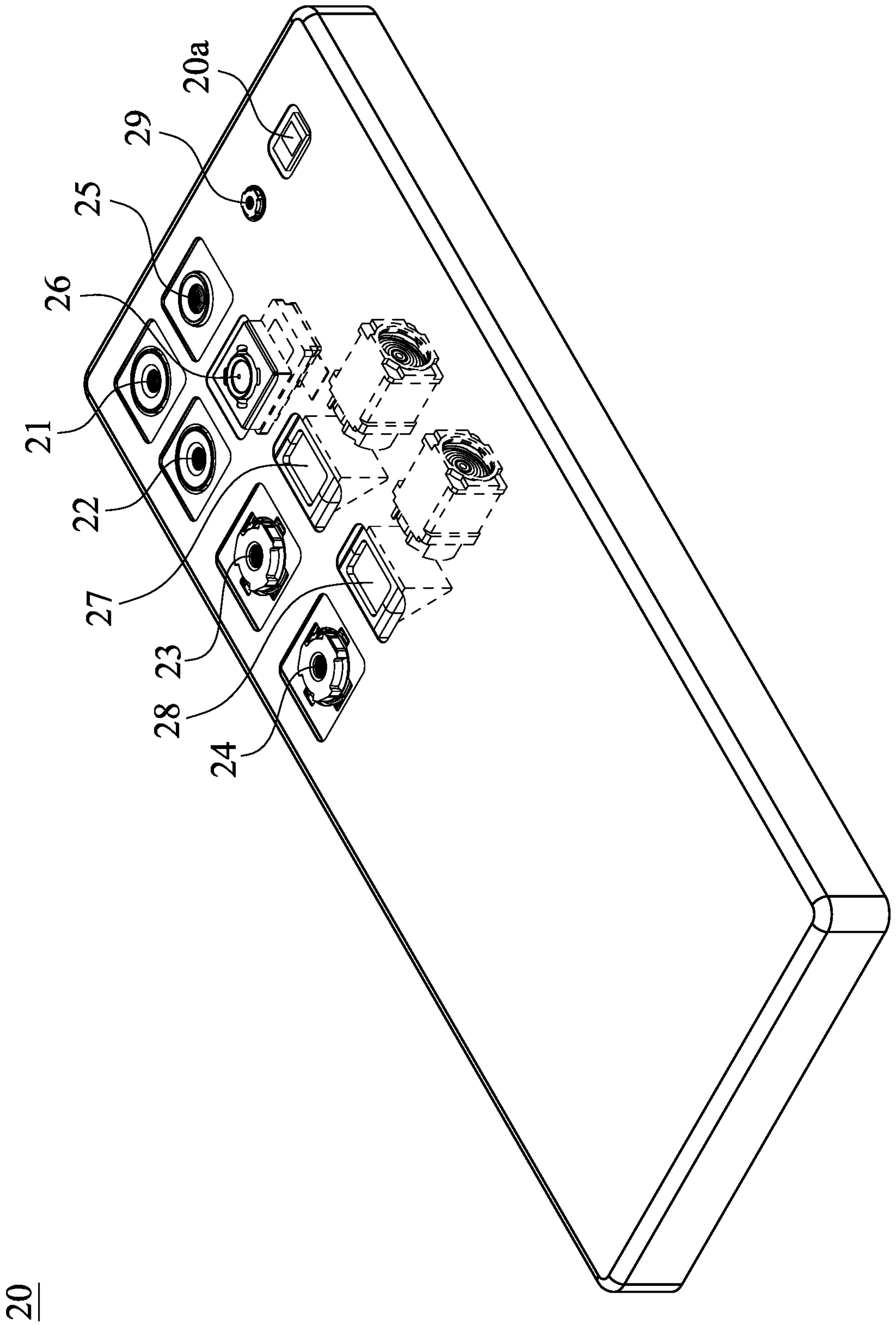
FIG. 8 is a schematic view of an electronic device according to the 8th example of the present disclosure.

FIG. 8 is a schematic view of an electronic device 20 according to the 8th example of the present disclosure. As shown in FIG. 8, the electronic device 20 is a smartphone, and the electronic device 20 includes a plurality of camera modules. Further, the camera modules are ultra-wide-angle camera modules 21, 22, wide-angle camera modules 23, 24, telephoto camera modules 25, 26, 27, 28, and a Time-Of-Flight (TOF) module 29. The TOF module 29 can be other types of camera modules, and the present disclosure is not limited thereto. Specifically, the camera modules can include the imaging lens assembly module according to any one of the 1st example to the 6th example and an image sensor (not shown), wherein the image sensor is disposed on an image surface of the imaging lens assembly module, but the present disclosure is not limited thereto.

Furthermore, the telephoto camera modules 27, 28 further have the function of folding a light path, but the present disclosure is not limited thereto.

According to the camera specifications of the electronic device 20, the electronic device 20 can further include an optical anti-shake mechanism (not shown). Further, the electronic device 20 can further include at least one focusing assisting module (its reference numeral is omitted) and at least one sensing component (not shown). The focusing assisting module can be a flash module 20*a*, an infrared distance measurement component, a laser focus module, etc. The flash module 20*a* is for compensating the color temperature. The sensing component can have functions for sensing physical momentum and kinetic energies, such as an accelerator, a gyroscope, and a Hall effect element, so as to sense shaking or jitters applied by hands of the user or external environments. Therefore, the autofocus function and the optical anti-shake mechanism of the camera modules disposed on the electronic device 20 can function to obtain a great imaging quality and facilitate the electronic device 20 according to the present disclosure to have a capturing function with multiple modes, such as taking optimized selfies, high dynamic range (HDR) with a low light source, 4K resolution recording, etc.

Furthermore, all of other structures and dispositions according to the 8th example are the same as the structures and the dispositions according to the 7th example, and will not be described again herein.

9th Example

Figure 9A:
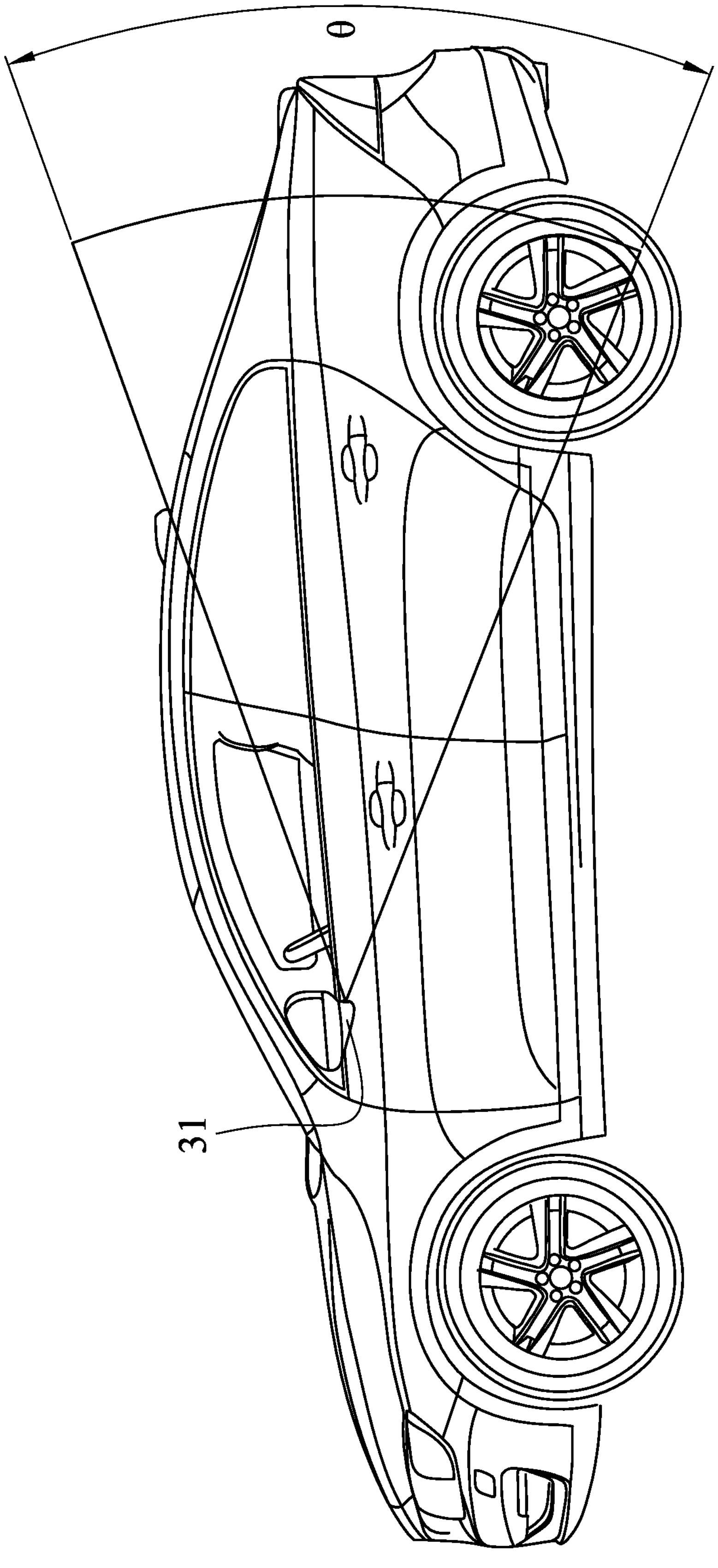
FIG. 9A is a schematic view of a vehicle instrument according to the 9th example of the present disclosure.
Figure 9B:
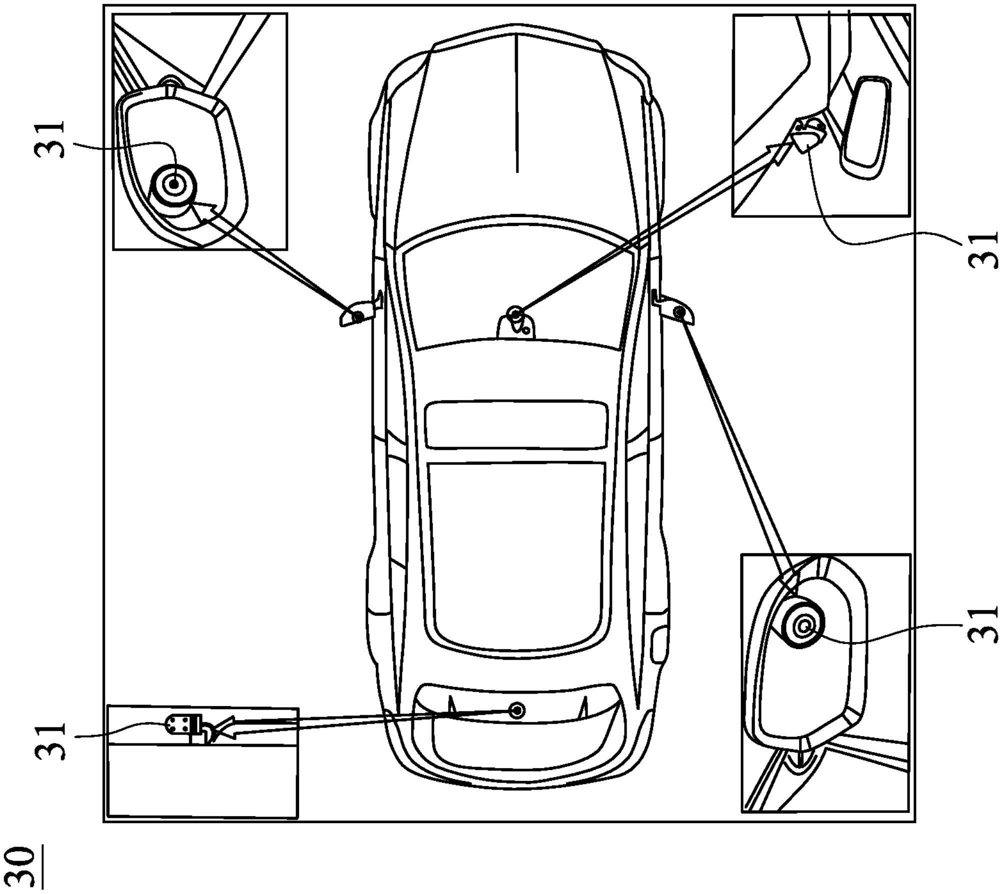
FIG. 9B is another schematic view of the vehicle instrument according to the 9th example of FIG. 9A.
Figure 9C:
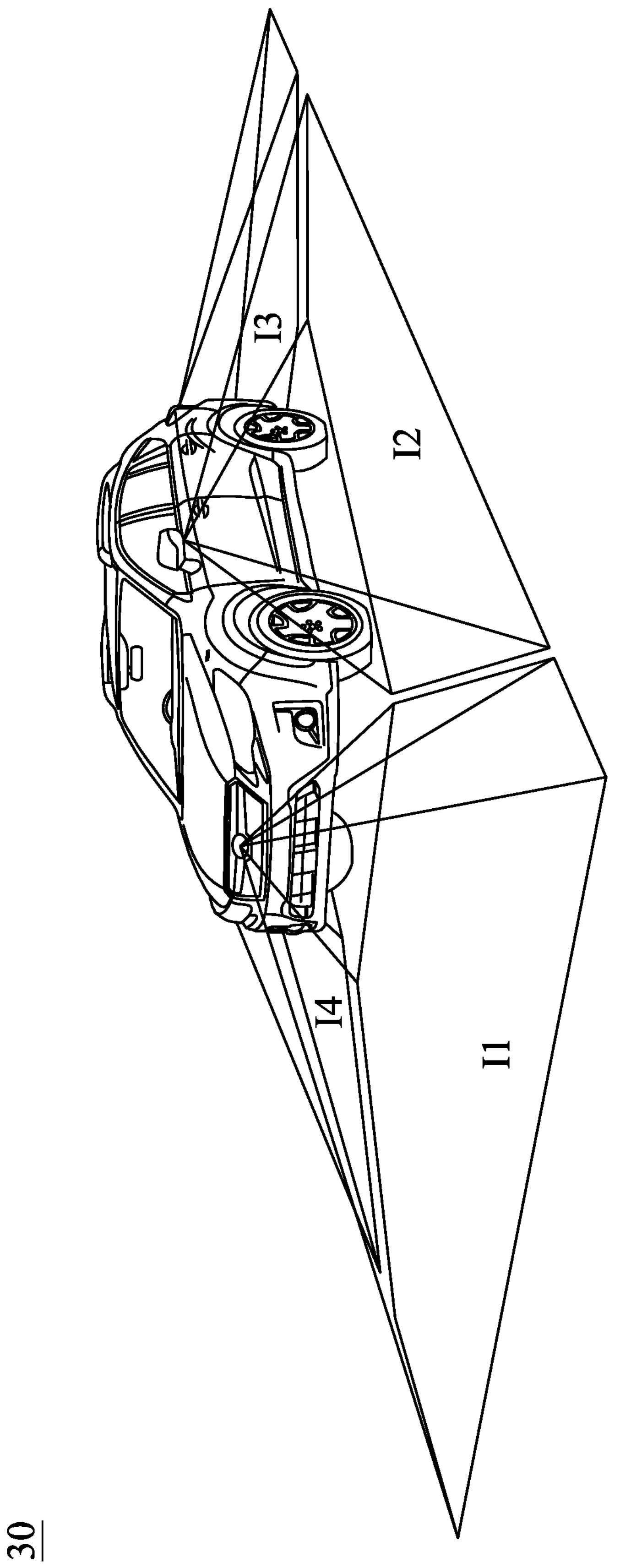
FIG. 9C is still another schematic view of the vehicle instrument according to the 9th example of FIG. 9A.

FIG. 9A is a schematic view of a vehicle instrument 30 according to the 9th example of the present disclosure. FIG. 9B is another schematic view of the vehicle instrument 30 according to the 9th example of FIG. 9A. FIG. 9C is still another schematic view of the vehicle instrument 30 according to the 9th example of FIG. 9A. As shown in FIG. 9A to FIG. 9C, the vehicle instrument 30 includes a plurality of camera modules 31. In the 9th example, a number of the camera modules 31 is six, and the camera modules 31 includes the imaging lens assembly module according to any one of the 1st example to the 6th example and an image sensor (not shown), wherein the image sensor is disposed on an image surface of the imaging lens assembly module, but the present disclosure is not limited thereto.

As shown in FIG. 9A and FIG. 9B, the camera modules 31 are automotive camera modules, two of the camera modules 31 are located under rearview mirrors on a left side and a right side, respectively, and the aforementioned camera modules 31 are configured to capture the image information of a visual angle $\theta$. In particular, the visual angle $\theta$ can satisfy the following condition: 40 degrees $<\theta<$90 degrees. Therefore, the image information in the regions of two lanes on the left side and the right side can be captured.

As shown in FIG. 9B, another two of the camera modules 31 can be disposed in the inner space of the vehicle instrument 30. In particular, the aforementioned two camera modules 31 are disposed on a location close to the rearview mirror inside the vehicle instrument 30 and a location close to the rear car window, respectively. Further, the camera modules 31 can be further disposed on the rearview mirrors on the left side and the right side except the mirror surface, respectively, but the present disclosure is not limited thereto.

As shown in FIG. 9C, another two of the camera modules 31 can be disposed on a front end of the vehicle instrument 30 and a rear end of the vehicle instrument 30, respectively. By disposing the camera modules 31 on the front end and the rear end of the vehicle instrument 30 and under the rearview mirror on the left side of the vehicle instrument 30 and the right side of the vehicle instrument 30, it is favorable for the drivers obtaining the external space information in addition to the driving seat, such as the external space information 11, 12, 13, 14, but the present disclosure is not limited thereto. Therefore, more visual angles can be provided to reduce the blind spot, so that the driving safety can be improved. Further, it is favorable for identifying the real-time traffic information outside the vehicle instrument 30 by disposing the camera modules 31 around the vehicle instrument 30, and the automatic assisted driving function can be realized.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly module, comprising:
an imaging lens assembly, comprising:
at least one optical lens element;
a light path folding element disposed on an image side of the at least one optical lens element, wherein the light path folding element has a light incident surface, a light exiting surface and at least one optical reflecting surface; and
a plastic assembling element, comprising:
an assembling surface for assembling the plastic assembling element to the light path folding element, wherein the assembling surface is physically contacted with the light path folding element;
a first surface disposed towards the light path folding element; and
a second surface disposed towards the light path folding element, wherein the second surface and the first surface are disposed adjacent to each other;
wherein the second surface of the plastic assembling element and the at least one optical reflecting surface of the light path folding element are correspondingly disposed;
wherein the second surface comprises a protruding structure array, and the protruding structure array comprises at least seven protruding structures arranged at equal intervals.

2. The imaging lens assembly module of claim 1, wherein the first surface of the plastic assembling element is a matte surface, and the first surface and the at least one optical reflecting surface of the light path folding element are correspondingly disposed.

3. The imaging lens assembly module of claim 1, wherein the first surface of the plastic assembling element is not physically contacted with the light path folding element.

4. The imaging lens assembly module of claim 1, wherein the second surface of the plastic assembling element is not physically contacted with the light path folding element.

5. The imaging lens assembly module of claim 1, wherein the assembling surface of the plastic assembling element is disposed adjacent to the first surface.

6. The imaging lens assembly module of claim 1, wherein a spacing distance between each two of the protruding structures adjacent to each other in the protruding structure array is t, and the following condition is satisfied:

$$0.01\text{ mm} < t < 0.25\text{ mm}.$$

7. The imaging lens assembly module of claim 6, wherein the spacing distance between each two of the protruding structures adjacent to each other in the protruding structure array is t, and the following condition is satisfied:

$$0.01\text{ mm} < t < 0.15\text{ mm}.$$

8. The imaging lens assembly module of claim 1, wherein a height of each of the protruding structures is d, and the following condition is satisfied:

$$0.001\ \text{mm} \leq d \leq 0.095\ \text{mm}.$$

9. The imaging lens assembly module of claim 8, wherein the height of each of the protruding structures is d, and the following condition is satisfied:

$$0.009\ \text{mm} \leq d \leq 0.065\ \text{mm}.$$

10. The imaging lens assembly module of claim 9, wherein the height of each of the protruding structures is d, and the following condition is satisfied:

$$0.015\ \text{mm} \leq d \leq 0.065\ \text{mm}.$$

11. The imaging lens assembly module of claim 1, wherein the plastic assembling element further comprises an opening structure, and the opening structure and the light exiting surface of the light path folding element are correspondingly disposed.

12. The imaging lens assembly module of claim 11, wherein a spacing distance between the second surface and the opening structure is Dh, a spacing distance between the second surface and the light path folding element is Dp, and the following condition is satisfied:

$$0 \leq Dh/Dp < 6.3.$$

13. The imaging lens assembly module of claim 12, wherein the spacing distance between the second surface and the opening structure is Dh, the spacing distance between the second surface and the light path folding element is Dp, and the following condition is satisfied:

$$0 \leq Dh/Dp < 4.8.$$

14. The imaging lens assembly module of claim 1, wherein the plastic assembling element further comprises at least three gate traces.

15. The imaging lens assembly module of claim 1, wherein an area of the first surface within an area of the plastic assembling element is Af, an area of the second surface within the area of the plastic assembling element is As, and the following condition is satisfied:

$$0.05 < As/Af < 3.5.$$

16. The imaging lens assembly module of claim 1, wherein the light path folding element further comprises an abutting surface, and the abutting surface and the assembling surface of the plastic assembling element are assembled and abutted against each other.

17. The imaging lens assembly module of claim 1, wherein a number of the protruding structures is at least seventeen, and the protruding structures are regularly arranged at equal intervals.

18. The imaging lens assembly module of claim 17, wherein the number of the protruding structures is at least twenty-nine, and the protruding structures are regularly arranged at equal intervals.

19. The imaging lens assembly module of claim 1, wherein the at least one optical reflecting surface is an optical total internal reflecting surface, and the at least one optical reflecting surface is for proceeding a total internal reflection of an imaging light of the imaging lens assembly module in the light path folding element.

20. The imaging lens assembly module of claim 19, wherein a number of the at least one optical reflecting surface of the light path folding element is at least two, and the optical reflecting surfaces are for reflecting the imaging light of the imaging lens assembly module.

21. A camera module, comprising:

the imaging lens assembly module of claim 1; and an image sensor disposed on an image surface of the imaging lens assembly module.

22. An electronic device, comprising:

the camera module of claim 21.

* * * * *